United States Patent

Martin

[15] 3,662,112

[45] May 9, 1972

[54] AUTOMATIC SECURITY SYSTEM

[72] Inventor: Stephen J. Martin, Miami, Fla.

[73] Assignee: Robertshaw Controls Company, Richmond, Va.

[22] Filed: Dec. 22, 1969

[21] Appl. No.: 887,250

[52] U.S. Cl. ....... 179/5 P

[51] Int. Cl. ....... H04m 11/04

[58] Field of Search ....... 179/5, 5 P, 2 A, 18 BD, 18 BE, 179/18 BF, 1 HF, 1 MN, 1 CN

[56] References Cited

UNITED STATES PATENTS

| | | | |
|---|---|---|---|
| 3,531,597 | 9/1970 | Andrews et al. | 179/5 P |
| 2,844,659 | 7/1958 | Shaw | 179/1 MN |
| 3,384,713 | 5/1968 | Duncan | 179/2 A |
| 3,443,032 | 5/1969 | Mitsui | 179/2 A |
| 2,397,881 | 4/1946 | Nitterauer | 179/18 BF |
| 2,535,162 | 12/1950 | Rodgers | 179/18 BF |
| 2,727,947 | 12/1955 | Nilsson | 179/18 BF |
| 3,038,965 | 6/1962 | Civitano | 179/1 MN |
| 2,898,405 | 8/1959 | Eck | 179/1 MN |

*Primary Examiner*—Kathleen H. Claffy
*Assistant Examiner*—David L. Stewart
*Attorney*—Anthony A. O'Brien

[57] ABSTRACT

An automatic security system for use with public telephone facilities to centrally monitor various alarm events occurring at any one of a plurality of remote locations. The system includes a central monitoring complex having a number of operator stations connected to a local public telephone exchange, and a plurality of subscriber unit circuits, one for each remote location to be monitored, also coupled to public telephone exchange apparatus by conventional telephone lines. A number of sensing devices at each remote location operate in response to various alarm conditions to energize the subscriber unit causing automatic dialing of the central complex whereupon one of the operator stations will receive the call. The system includes solid-state circuitry for enabling effective operator station control of the various functions of the subscriber unit during an emergency by utilizing timed command tone signals.

36 Claims, 8 Drawing Figures

INVENTOR.
J. MARTIN

INVENTOR,
STEPHEN J. MARTIN

BY Anthony A. O'Brien
ATTORNEY

INVENTOR,
STEPHEN J. MARTIN
BY Anthony A. O'Brien
ATTORNEY

INVENTOR,
STEPHEN J. MARTIN

BY Anthony A. O'Brien
ATTORNEY

INVENTOR,
STEPHEN J. MARTIN

BY Anthony A. O'Brien
ATTORNEY

INVENTOR,
STEPHEN J. MARTIN

BY Anthony A. O'Brien
ATTORNEY

AUTOMATIC SECURITY SYSTEM

BACKGROUND OF THE INVENTION

1. Field of the Invention

The present invention pertains to security systems and more particularly to private automatic security systems employing public telephone facilities.

2. Description of the Prior Art

Various security systems have been developed in the past to automatically alert a centrally located operator of the existence of an alarm condition sensed at any one of a number of remote points. Such systems conventionally provide either continuous supervision for assuring constant communication between the remote and central stations, or selective supervision arranged to automatically energize signal transmission upon the occurrence of a specific event. In systems of the latter type, public telephone facilities are often used for interconnecting the various remote points to the central operator location, especially where the remote points are separated from the central location by a considerable distance.

In order to provide a practical automatic telephone security system, provision must be made to assure proper placing of a call to a central monitoring point, automatic subscriber identification code transmission, redialing when there is no answer or when a wrong number has been previously dialed, resetting capability by the central station operator, and total cancel control by the central operator to disable a subscriber's unit in the event of a failure mode which would otherwise tie up the subscriber's telephone line. Such systems must also establish high sensing accuracy and assure maintenance-free operation both at reduced cost, complexity and size.

While prior telephone security systems have served the purpose and have provided some of the above mentioned functions, they have not proven entirely satisfactory under all conditions of operation for a number of reasons. For example, many of such systems utilize complex mechanisms for mechanically dialing the operator location upon the occurrence of an alarm condition, and in addition, often include electronic relay switching networks to perform required logic functions, such as the control of condition sensing, dialing, voice communication, and system resetting. Both the mechanical apparatus and the relay operated logic networks have been found to be bulky, typically require frequent maintenance and often exhibit a high false-alarm rate. Even though many of these problems have been known for a considerable period of time, an efficient and reliable security system has heretofore been unavailable.

SUMMARY OF THE INVENTION

The present invention may be summarized in that an automatic security system for use with a telephone system includes a subscriber unit connecting a first telephone line to the telephone system and further including a dialing circuit connected to the first telephone line for applying dialing pulses corresponding to a preselected telephone number to the first telephone line in response to the occurrence of a predetermined condition, a communication circuit connected to the first telephone line for transmitting and receiving audio communication signals along the first telephone line, and a control circuit connected to the dialing circuit, the communication circuit and the first telephone line for selectively controlling the dialing circuit and the communication circuit in response to command signals appearing on the first telephone line and having first and second predetermined envelope variations, respectively. The system also includes an operator station connected to a second telephone line and containing a connecting circuit coupling the second telephone line to the telephone system in response to the dialing of the preselected number by the subscriber unit dialing circuit, and a command signal generator connected to the second telephone line and having first and second operative modes for selectively applying command signals having the first and second predetermined envelope variations to the second line for transmission to the first telephone line by the telephone system whereby operation of the subscriber unit can be remotely controlled from the operator station.

It is an object of the present invention to automatically alert an operator of the existence of a sensed condition at any one of a number of remote points.

The present invention has an additional object in the construction of a solid-state electronic security system for use with public telephone facilities.

Another object of the present invention is to electronically apply dialing pulses to a public telephone line in response to a sensed condition at a remote point whereby an operator station will be alerted as to the existence of the condition and thereafter will be automatically placed in a receive mode to accept audio signal transmission from the remote point.

The present invention has a further object in the construction of an automatic security system which includes a central operator station utilizing envelope variations of tone signals from a signal generator to remotely control the mode of operation of a subscriber unit.

Another object of the present invention is the construction of a security system which includes a number of subscriber units each including feedback timing circuitry for accurately resetting a dialing network if an operator at a central location fails to acknowledge a call or if a wrong number has been previously dialed.

A further object of the present invention is the construction of electronic circuitry which can be controlled by a central operator to disable a subscriber unit and remove it from the public telephone system in the event of subscriber unit failure.

The present invention is advantageous over prior art systems in that solid-state electronic devices are employed to perform switching and logic functions, that a central complex can be automatically dialed upon receipt of an alarm, that subscriber identification signals can be automatically transmitted to an operator station upon receipt of a subscriber call, that an operator station can be automatically redialed by a subscriber unit until receipt of an acknowledge signal, that a central station operator can control the mode of operation of a subscriber, and that a central station operator can disable the subscriber unit and remove it from the telephone line in case of malfunction.

Further objects and advantages of the present invention will become apparent from the following description of a preferred embodiment when taken in conjunction with the accompanying drawings.

DESCRIPTION OF THE PREFERRED EMBODIMENT

Figure 1:
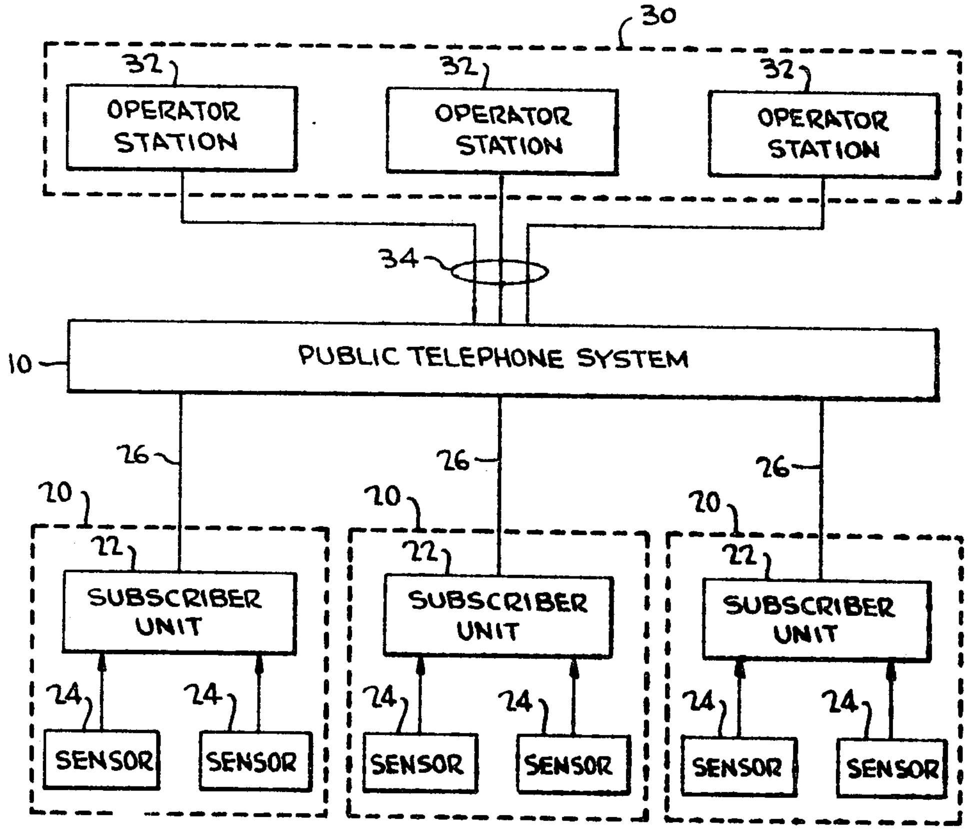
FIG. 1 is a block diagram of an embodiment of an automatic security system of the present invention.

The present invention is embodied in an automatic security system, illustrated in block diagram form in FIG. 1, including a conventional public telephone system 10 which interconnects a number of remote subscriber locations 20 with a central monitoring complex 30. Any number of remote subscriber locations may be monitored by the system of the present invention, and each include a subscriber unit 22 coupled to receive alarm signals from a plurality of condition responsive sensors 24. Subscriber units 22 are connected to the public telephone system 10 by conventional leased telephone lines 26 and are adapted to automatically dial through the public telephone system to the central monitoring complex 30 upon the occurrence of a sensed event as detected by one of the condition responsive sensors 24. It is noted that while only two sensors are shown for each remote location 20, any number of various sensing devices may be utilized to detect such conditions as fire, object movement, temperature, pressure, humidity, fluid flow rates, vibration amplitudes and shaft R.P.M., to name but a few. The sensors 24 may thus take any number of various forms, the only requirement being that the sensor must be capable of completing an electrical current path either directly or through intermediate circuitry upon the occurrence of the monitored condition.

The central monitoring complex 30 includes a number of operator stations 32 for receiving alarm signals from the remote subscriber locations 20. As illustrated in FIG. 1, the central monitoring complex is interconnected with the public telephone system 10 by a number of telephone lines 34 which may be connected to a conventional rotary sequencing network in the telephone system for automatically transferring an incoming call to a succeeding line in the event that a preceeding line is busy. While only three lines are shown, one for each operator station 32, it should be understood that any number of lines can be employed, some or all of which may be fed to each operator station, as desired. In this manner, any number of incoming calls to the central monitoring complex 30 can be efficiently accommodated to assure prompt receipt of a subscriber alarm.

Before proceeding to a detailed description of the subscriber unit and operator station circuitry and operation, a general outline of the sequence of operation of the system of the present invention may be helpful. When an alarm condition is sensed by a sensor 24 at a subscriber location 20, an arming circuit in the subscriber unit 22 will be latched on to apply power to the subscriber unit circuitry. The subscriber unit then seizes a telephone line and automatically begins dialing the central monitoring complex 30. When the dialing is completed and the call has been made to interconnect the control complex and the remote subscriber through the telephone system, an identification code will be transmitted by the subscriber unit notifying a control station operator of the identity of the calling subscriber. In the event that the station operator fails to acknowledge the call, the subscriber unit will automatically reset its dialing mechanism and place a second call to the central monitoring complex. The subscriber unit will continue to repeat the dialing sequence until a station operator acknowledges receipt of the alarm condition.

Upon acknowledgement the subscriber unit is automatically placed in a transmit mode to enable the station operator to audibly monitor various environmental conditions existing at the subscriber's location. The station operator then has complete control over the mode of operation of the subscriber station and can transmit and receive voice messages along the telephone lines as desired. When no further communication between the station operator and the subscriber is desired, the operator thereafter energizes a cancel circuit to automatically terminate the call and remove the subscriber unit from the telephone system. In the event that one of the condition responsive sensors 24 malfunctions to reinitiate the above sequence of operation immediately after the station operator has terminated a preceding call, the station operator can actuate a total cancel circuit to disable the dialing function of the subscriber unit and thereby free the subscriber's telephone line for conventional use.

Figure 2:
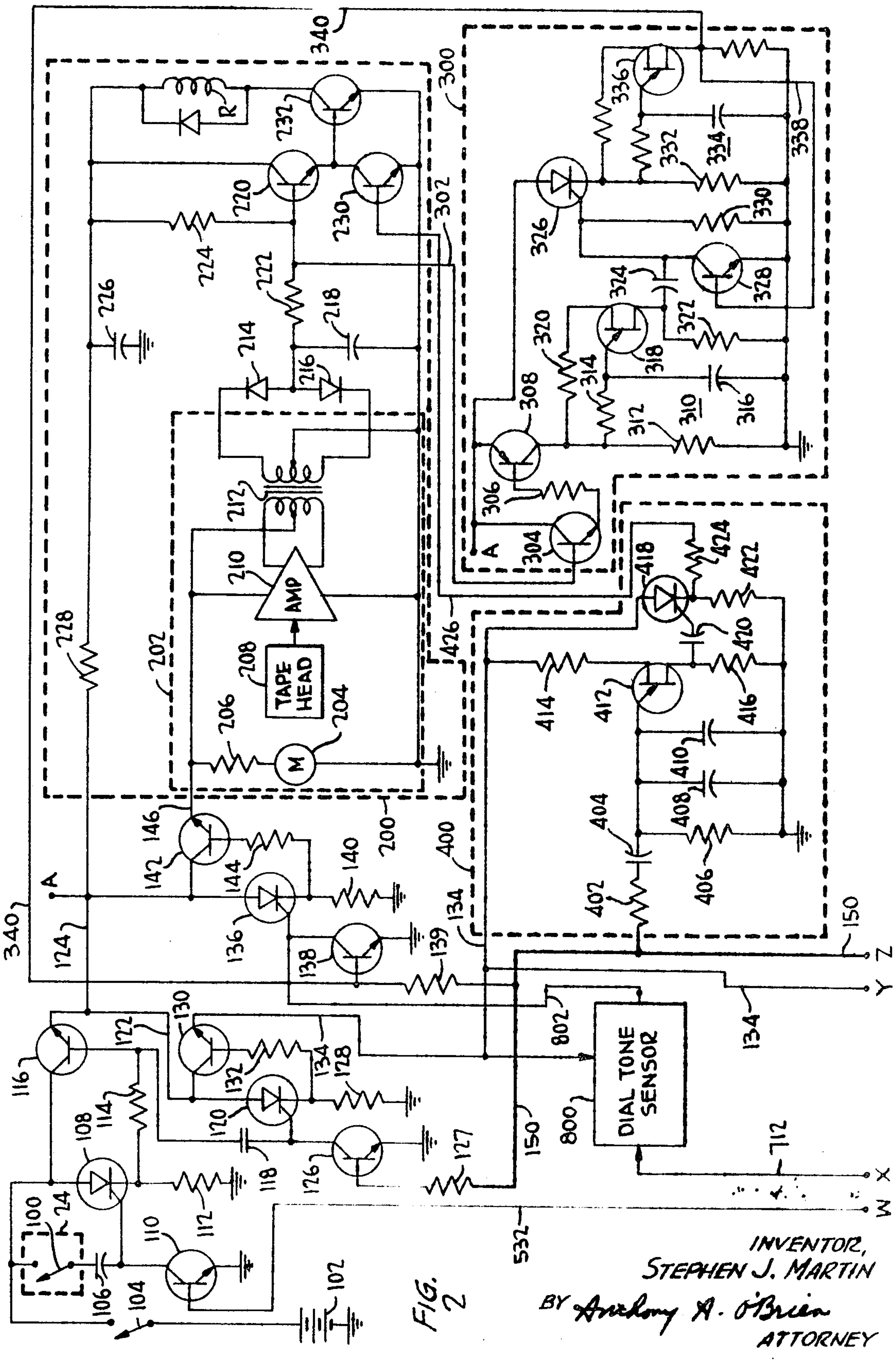
FIGS. 2 and 3 are schematic diagrams which, taken together, illustrate a subscriber unit of the system of FIG. 1.
Figure 3:
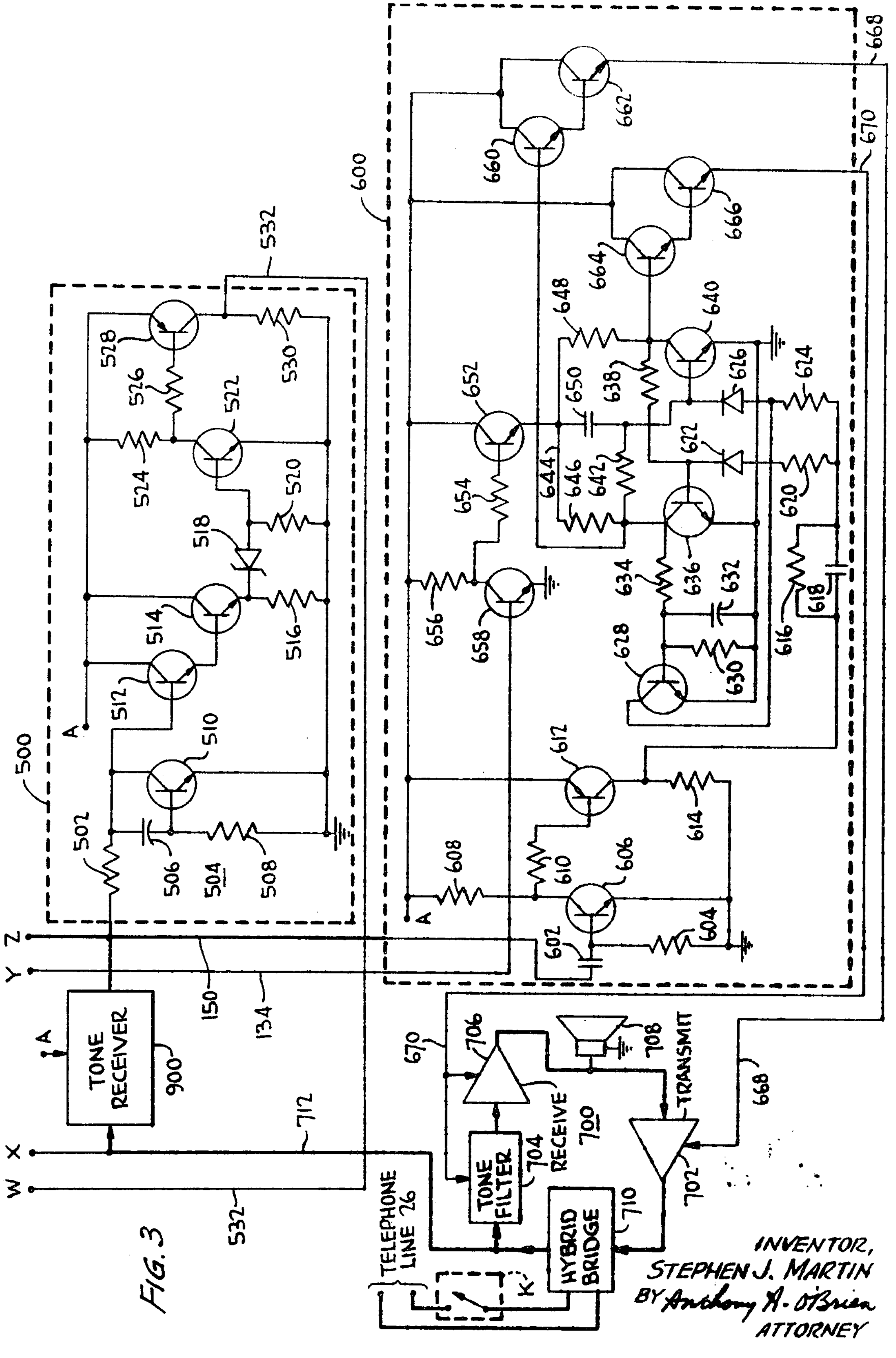

A schematic diagram for a subscriber unit 22 of FIG. 1 is shown in FIGS. 2 and 3 and includes a single condition responsive sensor 24 illustrated for the sake of simplicity as a single-pole single-throw switch 100. The unit is powered from a source of positive potential 102 through a master power switch 104 which may be provided with a key-operated tamper-proof lock if desired. When power switch 104 is closed and an alarm condition is sensed, switch 100 closes and applies voltage from source 102 to a capacitor 106 connected between switch contacts 100 and the gate electrode of a controlled rectifier 108. The gate is also connected to ground through the collector-emitter path of a normally non-conductive NPN transistor 110. Rectifier 108 has its anode coupled to source 102 through main power switch 104 and its cathode returned to ground through a resistor 112. The cathode electrode of controlled rectifier 108 is connected through a resistor 114 to the junction of the base electrode of an NPN transistor 116 and a coupling capacitor 118 which is also connected to the gate electrode of a second controlled rectifier 120.

The anode of controlled rectifier 120 is connected to the emitter electrode of transistor 116 by a line 122 which is coupled through the collector-emitter path of transistor 116 and switch 104 to power source 102. A main power bus 124 is connected to line 122 for supplying operating potential to various sub-circuit assemblies of the subscriber unit through power point A, as will be described below. The gate and cathode electrodes of rectifier 120 are respectively coupled to ground by the collector-emitter path of an NPN transistor 126 and a resistor 128. Transistor 126 has its base electrode coupled through a resistor 127 to a command-signal line 150, to be more fully described hereinbelow. A transistor 130 has its collector-base path coupled in parallel with the anode-cathode circuit of rectifier 120 by a resistor 132 and has its emitter electrode connected to a second power bus 134. A third controlled rectifier 136 has its anode connected to line 122 by power bus 124 and has its gate and cathode electrodes coupled to ground by the collector-emitter circuit of a transistor 138 and a resistor 140, respectively. As with transistor 126, transistor 138 has its base connected to command-signal line 150 through a resistor 139. A transistor 142 has its collector-base path coupled in parallel with the anode-cathode circuit of rectifier 136 by a resistor 144 and has its emitter electrode connected to a third power bus 146.

A dialing circuit 200 includes a tape deck 202 connected to receive operating potential from the third power bus 146. The tape deck includes a tape drive motor 204 having one terminal connected to power bus 146 by a resistor 206 and an other terminal connected to ground. A tape head 208 is coupled to the input of an amplifier 210 which has a push-pull output transformer 212. The amplifier as well as a center-tap of the primary winding of transformer 212 are connected to power bus 146. The secondary winding of the transformer has a center-tap connection to ground and has its end terminals coupled across a pair of oppositely-polarized series connected diodes 214 and 216 which produce a negative signal at their anode junction in response to signals stored by the tape deck. The junction of the anodes of diodes 214 and 216 is coupled to ground by a filter capacitor 218 and to the base of an NPN transistor 220 by a resistor 222. The base of transistor 220 is also coupled by a resistor 224 and a transient filter, which includes a by-pass capacitor 226 and a resistor 228, to main power bus 124. The collector electrode of transistor 220 is connected at the junction of resistor 224 and the transient filter resistor 228 to power bus 124, and the emitter electrode of the transistor is coupled to ground through the collector-emitter path of a transistor 230. The junction of the emitter of transistor 220 and the collector of transistor 230 is connected to the base of a transistor 232 which has its collector-emitter path coupled in series with a diode protected dialing relay coil R having a set of normally open dialing contacts K connected in one side of subscriber telephone line 26 (FIG. 3). The series network of relay coil R and transistor 232 is coupled between main power bus 124 (through transient filter 226–228) and ground.

A tape reset circuit 300 has an input line 302 coupling the junction of resistor 222 and the base of transistor 220 to the base of an NPN transistor 304. Transistor 304 has its collector coupled to main power bus 124 through power point A and its emitter connected by a resistor 306 to the base of a PNP transistor 308. Transistor 308 has its emitter connected to power point A and its collector coupled to a timing network 310. The timing network 310 includes a resistor 312 connected between the collector of transistor 308 and ground and further connected in parallel with a series network formed by a resistor 314 and a capacitor 316. The junction of resistors 314 and capacitor 316 is connected to the emitter of a unijunction transistor 318 which has a first base coupled to the collector of transistor 308 by a resistor 320 and a second base returned to ground by a resistor 322. The second base of unijunction transistor 318 is also fed by coupling capacitor 324 to the gate of a controlled rectifier 326. The gate of rectifier 326 is coupled to ground by the parallel circuit network formed by the collector-emitter path of an NPN transistor 328 and a resistor 330. Rectifier 326 has its anode electrode connected to power point A and its cathode coupled to ground by a resistor 332 which is part of a second timing network 334 identical in construction timing network 310. The output from the tape reset circuit 300 is taken from the base of a unijunction transistor 336 of second timing network 334 and fed back on line 338 to the base of transistor 328. The output signal is also coupled via line 340 to the base of transistor 138.

A total cancel circuit 400 includes a resistor 402 coupled between the subscriber unit signal line 150 and a capacitor 404. Capacitor 404 has its other end coupled to ground by a parallel network formed by a resistor 406 and capacitors 408 and 410. Capacitor 404 is also coupled to the emitter electrode of a unijunction transistor 412 which has a first base connected to second power bus 134 by a resistor 414 and a second base coupled to ground through a resistor 416 and to the gate electrode of a controlled rectifier device 418 by a coupling capacitor 420. The controlled rectifier 418 has its anode electrode coupled to power point A and its cathode electrode connected to one end of a pair of resistors 422 and 424. The other end of resistor 422 is connected to ground for providing a return current path for rectifier 418, while the other end of resistor 424 is connected by line 426 to the base of transistor 230 of dialing circuit 200.

The subscriber unit also includes a cancel circuit 500, shown in FIG. 3. The cancel circuit is coupled at an input to command signal line 150 by a resistor 502 which is part of a saw tooth generator 504. The saw tooth generator includes a capacitor 506 coupled in series with a resistor 508 between resistor 502 and ground, and a transistor 510 having its base connected to the junction of capacitor 506 and resistor 508. The collector-emitter path of transistor 510 is also connected between resistor 502 and ground, the collector electrode being further coupled to the base of a transistor 512. Transistor 512 has its collector connected to power point A and its emitter coupled to the base of a transistor 514 which has its collector tied to point A and its emitter returned to ground through a resistor 516. The junction of transistor 514 and resistor 516 is connected to the cathode of a Zener diode 518 which has its anode coupled by a resistor 520 to ground and further coupled directly to the base of an NPN transistor 522. Transistor 522 has its emitter grounded and its collector connected by resistors 524 and 526 to power point A and to the base of a PNP transistor 528, respectively. Transistor 528 has its emitter directly coupled to point A and its collector returned to ground by a resistor 530. The output from cancel circuit 500 is picked off at the junction of transistor 528 and resistor 530 and is fed via line 532 to the base of transistor 110 (FIG. 2) for controlling rectifier device 108.

The subscriber unit 22 also includes a transmit-receive logic circuit 600 which is connected to command signal line 150 by an input coupling capacitor 602. The other side of capacitor 602 is coupled to ground by a resistor 604 and to the base of an NPN transistor 606 which has its emitter grounded and its collector electrode coupled to point A by a resistor 608. The collector of transistor 606 is also coupled by a resistor 610 to the base of a PNP transistor 612 which has its emitter directly tied to point A and its collector returned to ground through a resistor 614. Transistors 606 and 612 form a waveshaping network designed to shape command pulses from line 150 and apply them to a bistable network through a differentiator formed by the parallel connection of a resistor 616 and a capacitor 618.

The other side of differentiator 616–618 is connected to an input steering gate of the bistable network. The steering gate has a high resistance branch including a resistor 620 connected between the differentiator and the anode of a diode 622. The gate also has a low resistance branch including a resistor 624 coupled between the differentiator and the anode of a diode 626. The collector-emitter path of an NPN transistor 628 is coupled between the junction of resistor 624 and diode 626 and ground so as to shunt the low resistance branch of the steering gate when the transistor 628 is in its conductive state. Transistor 628 is controlled by an RC timing network formed by a resistor 630 and a capacitor 632 coupled in parallel between the base of the transistor and ground. The base of the transistor is also connected through a resistor 634 to the collector of a transistor 636 which has its emitter grounded and its base connected to the cathode of diode 622 and to a resistor 638. The other side of resistor 638 is connected to the collector of a transistor 640 which has its emitter grounded and its base coupled to the cathode of diode 626 and to the collector of transistor 636 by a resistor 642. The collector electrodes of transistors 636 and 640 are connected to a power bus 644 by resistors 646 and 648, respectively. In addition, a starting capacitor 650 is coupled between bus 644 and the base of transistor 640 so that transistor 640 will be in its conductive state when power is initially applied to bus 644.

The application of operating potential from point A to power bus 644 is controlled by a transistor 652 which has its collector-emitter path coupled therebetween. The base of transistor 652 is connected to point A by series connected resistors 654 and 656, which have their junction coupled to the collector of a transistor 658. Transistor 658 has its emitter grounded and its base directly connected to power line 134; in this manner, when bus 134 is carrying operating potential, transistor 658 will be conductive thereby grounding the junction of resistors 656 and 654 to keep transistor 652 off. With transistor 652 non-conductive, transistors 636 and 640 of the bistable network are inactive. If power is removed from line 134, transistor 652 turns on, and operating potential is fed from point A to the bistable network.

The output from the bistable network is taken from the collector electrodes of transistors 636 and 640 and fed to the base electrodes of transistors 660 and 664, respectively. Transistor 660 has its collector-emitter path coupled in parallel with the collector-base path of a transistor 662 so as to form a Darlington pair. The collector electrodes of the pair are connected to point A while the emitter of transistor 662 is connected to a transmit enable line 668. Transistor 664 is similarly coupled to form a Darlington pair with a transistor 666 for controlling the application of operating potential from point A to a receive enable line 670.

Transmit and receive enable lines 668 and 670 are connected to selectively apply power to a transmit amplifier 702, and a tone filter 704 and a receive amplifier 706, respectively, of an audio communication network 700. The transmit amplifier 702 has its input connected to a speaker-microphone 708 for amplifying audio sounds picked-up thereby and applying them to telephone line 26 through a hybrid bridge circuit 710. Incoming signals on telephone line 26 are coupled by hybrid bridge 710 to a control signal line 712 and to the input of tone filter 704 which has its output connected through receive amplifier 706 to the speaker-microphone 708 for audibly reproducing voice or other audio frequency messages.

A dial tone sensing circuit 800 (FIG. 2) has an input connected to control signal line 712 and an output connected to a dialing enable line 802 which is coupled to the gate of controlled rectifier 136. The dial tone sensor 800 receives operating potential from transistor 130 over power bus 134.

Control signal line 712 is also connected to the input of a tone receiving circuit 900 (FIG. 3) which is powered by operating potential from point A and has its output connected to command signal line 150.

Figure 4:
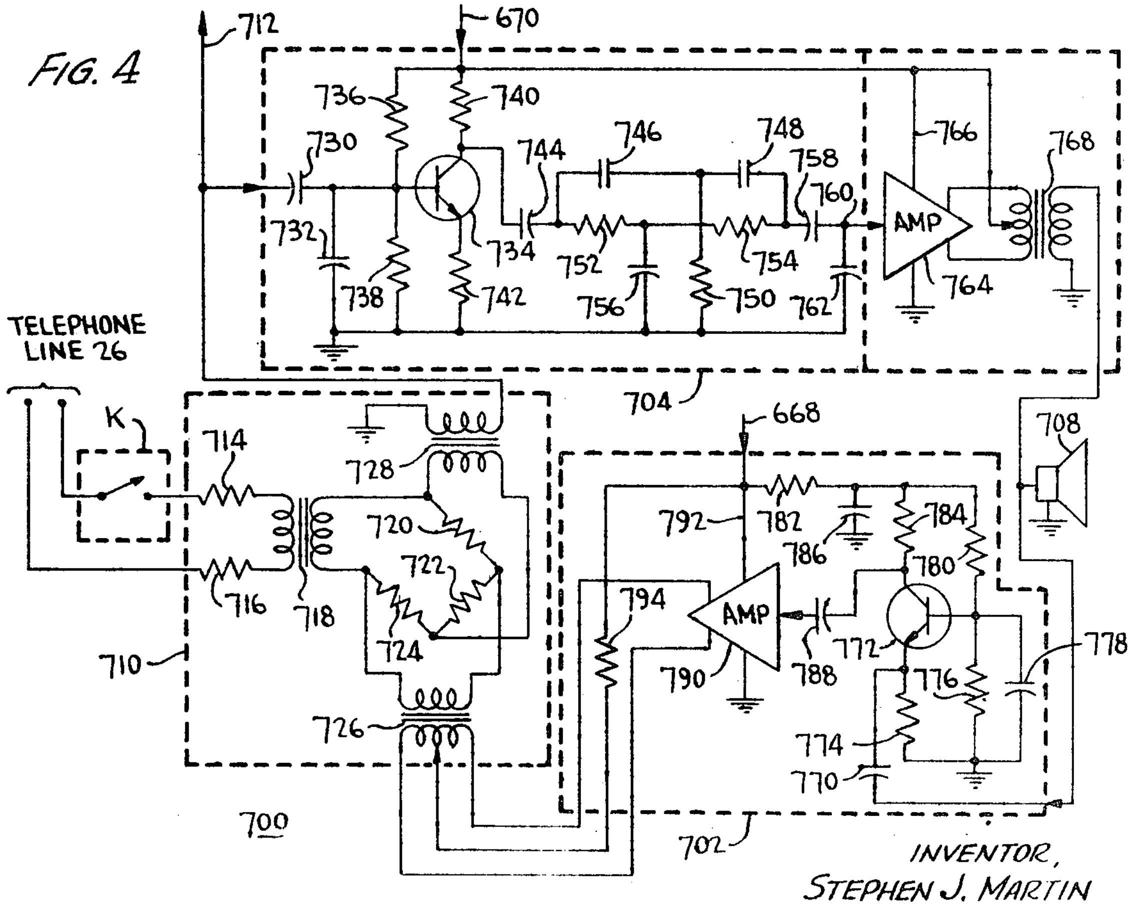
FIG. 4 is a schematic diagram of the hybrid bridge, tone filter, and transmit and receive amplifiers of FIGS. 2 and 3.

Referring now to FIG. 4, which illustrates the circuit details of the hybrid bridge 710, the transmit amplifier 702, the tone filter 704 and the receive amplifier 706, of the subscriber unit of FIGS. 2 and 3, telephone line 26 is coupled through dialing contacts K and impedance matching resistors 714 and 716 to a first winding of a transformer 718. A second winding of transformer 718 is connected as one leg of a four leg hybrid bridge which includes resistors 720, 722 and 724 forming the other three legs. A first winding of a transformer 726 is connected across the bridge at the junction of resistors 720 and 722 and the junction of resistor 724 and the second winding of transformer 718. A second winding of transformer 726 has first and second ends and a center tap, all three of which are coupled to transmit amplifier 702. A transformer 728 has a first winding connected across the bridge at the junction between resistors 722 and 724 and the junction of the second winding of transformer 718 and resistor 720. A second winding of transformer 728 has one side grounded and an other side connected to the input of a tuned filter 704 and to the control signal line 712.

The output from transformer 728 of the hybrid bridge 710 is connected to one side of a coupling capacitor 730 of the tone filter circuit 704. The other side of capacitor 730 is coupled to ground by a capacitor 732 and to the base of a transistor 734 which is biased to form an amplifier by resistors 736 and 738, coupled from the base electrode of the transistor to receive enable line 670 and ground, respectively. A resistor 740, coupled between the collector electrode and line 670, and a resistor 742, which couples the emitter electrode to ground, also furnish biasing potential for transistor 734. The output from amplifying transistor 734 is coupled by a capacitor 744 to a twin-T filter including a first T network having a pair of like capacitors 746 and 748 serially coupled to form a horizontal branch having a resistor 750 connected between the midpoint thereof and ground. The second T network includes a pair of serially coupled like resistors 752 and 754 connected in parallel with the series circuit formed by capacitors 746 and 748 and including a capacitor 756 coupled between the junction of resistors 752 and 754 and ground. The twin-T filter is designed to reject tone signals at the frequency used for control of the mode of operation of the subscriber unit through tone receiver 900, as will be explained below. The output side of the twin-T filter is fed through a coupling capacitor 758 to output junction 760 which is returned to ground by a capacitor 762 and is coupled to the input of the receive amplifier network 706.

Receive amplifier network 706 includes a conventional amplifier 764 having its power supply terminal coupled by line 766 to the receive enable line 670 and having a push-pull output. The output from amplifying network 764 is connected across one winding of an output coupling transformer 768 having a center-tap connection to receive enable line 670. A second winding of transformer 768 has one side coupled to ground and an other side coupled to one terminal of the speaker-microphone 708 which has its other terminal returned to ground to complete the output circuit path of the receive amplifier network 706.

The speaker-microphone 708 is also connected to the transmit amplifier network 702 by a capacitor 770 having its other end coupled to the emitter of a transistor 772. The emitter and base electrodes of transistor 772 are coupled to ground through resistors 774 and 776, respectively. The base electrode is also coupled to ground through a capacitor 778 and is connected to transmit enable line 668 by serially coupled resistors 780 and 782. A resistor 784 is coupled between the junction of resistor 780 and 782 and the collector electrode of transistor 772. The circuit also includes a transient bypass capacitor 786 coupled between the junction of resistors 780 and 782 and ground. The output from transistor 772 appearing at the collector electrode thereof is coupled through a capacitor 788 to the input of a conventional amplifier 790. Amplifier 790 has its power supply terminal coupled by line 792 to transmit enable line 668 and has a push-pull output connection to the two sides of the second winding of transformer 726 of the hybrid bridge 710. The center-tap of the second winding of transformer 726 is returned to transmit enable line 668 by a resistor 794.

Figure 5:
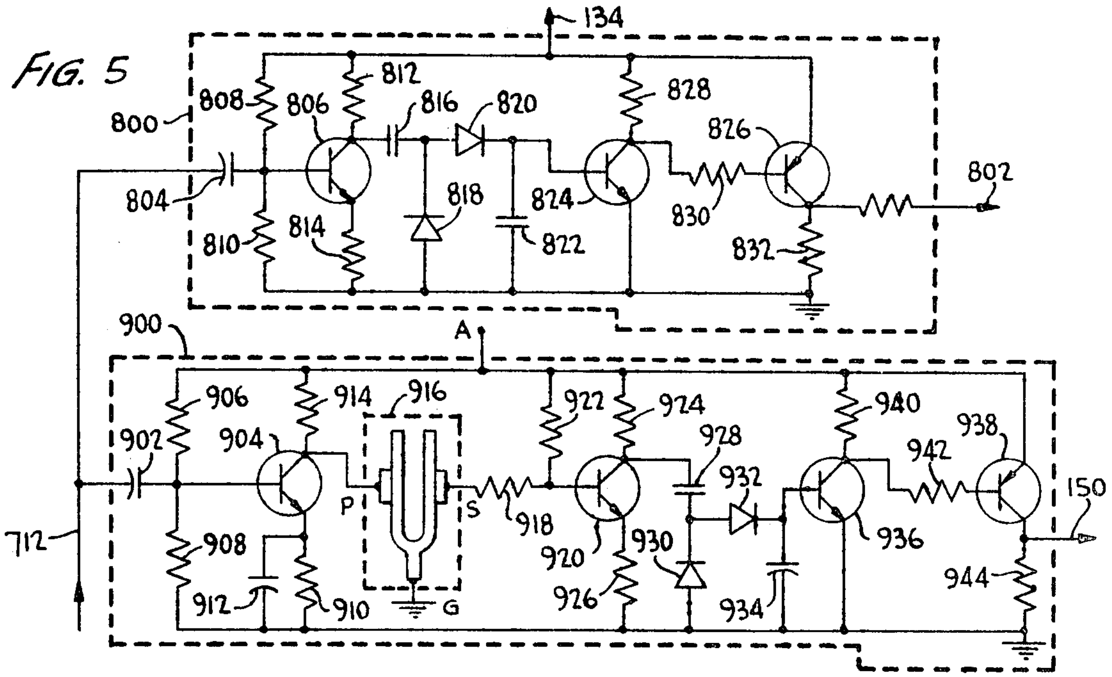
FIG. 5 is a schematic diagram of the dial tone sensor and tone receiver of FIGS. 2 and 3.

Referring to FIG. 5, which is a schematic diagram of the dial tone sensor 800 and the tone receiver 900 of FIGS. 2 and 3, dial tone sensor 800 includes an amplifier circuit, rectifying and filtering stages, and a waveshaping network. More specifically, control signal line 712 is connected by a coupling capacitor 804 to the base of a transistor amplifier 806 which is biased by resistors 808,810, 812 and 814 so as to amplify dial tone signals on line 712. The output from amplifier 806 is taken from the collector electrode and fed via a coupling capacitor 816 to diode rectifiers 818 and 820. Diode 818 has its anode grounded and its cathode electrode coupled to capacitor 816 and to the anode of diode 820 which has its cathode coupled to ground through a filter capacitor 822. The junction of diode 820 and capacitor 822 is connected to the base of an NPN transistor 824 which is coupled to a PNP transistor 826 by resistors 828, 830 and 832 so as to form a waveshaping network for feeding a square-wave output signal through a resistor 834 to line 802 whenever a dial tone signal is detected.

Control signal line 712 is also connected to the input of tone receiver 900 by a coupling capacitor 902 connected between line 712 and the base electrode of an amplifying transistor 904. Biasing resistors 906 and 908 are respectively connected between the base electrode of transistor 904 and power point A, and the base electrode of the transistor and ground. Transistor 904 has its emitter electrode coupled to ground by a parallel network including a resistor 910 and a capacitor 912 and its collector electrode connected to point A through a resistor 914. The output from amplifier transistor 904 is taken from its collector electrode and coupled to the primary side (labelled P) of a resonant fork tuned band-pass filter 916 which induces output signals at its secondary terminal (labelled S) whenever the frequency of input signals fed thereto is precisely the resonant frequency of the tuned fork. It is noted that while the tuned fork filter, as shown, is preferred, any of various equivalent devices such as crystal filters or tuned transformers may be utilized in the tone receiver of the present invention. The output from the tuned filter 916 is coupled by a resistor 918 to a second amplifying transistor 920 which receives operating potential through biasing resistors 922, 924 and 926. The amplified signal is coupled from the collector of transistor 920 to a diode rectifier by a capacitor 928; the rectifier includes a first diode 930 having its anode coupled to ground and its cathode coupled to capacitor 928, and a second diode 932 having its anode coupled to capacitor 928 and its cathode coupled to ground through a filter capacitor 934. The rectified and filtered output from the cathode side of diode 932 is fed to the base electrode of an NPN transistor 936 which is coupled to a PNP transistor 938 by biasing resistors 940, 942 and 944 to feed a positive voltage square-wave output signal command signal line 150 in response to input tone signals having a frequency equal to the resonant frequency of tuned filter 916.

Figure 6:
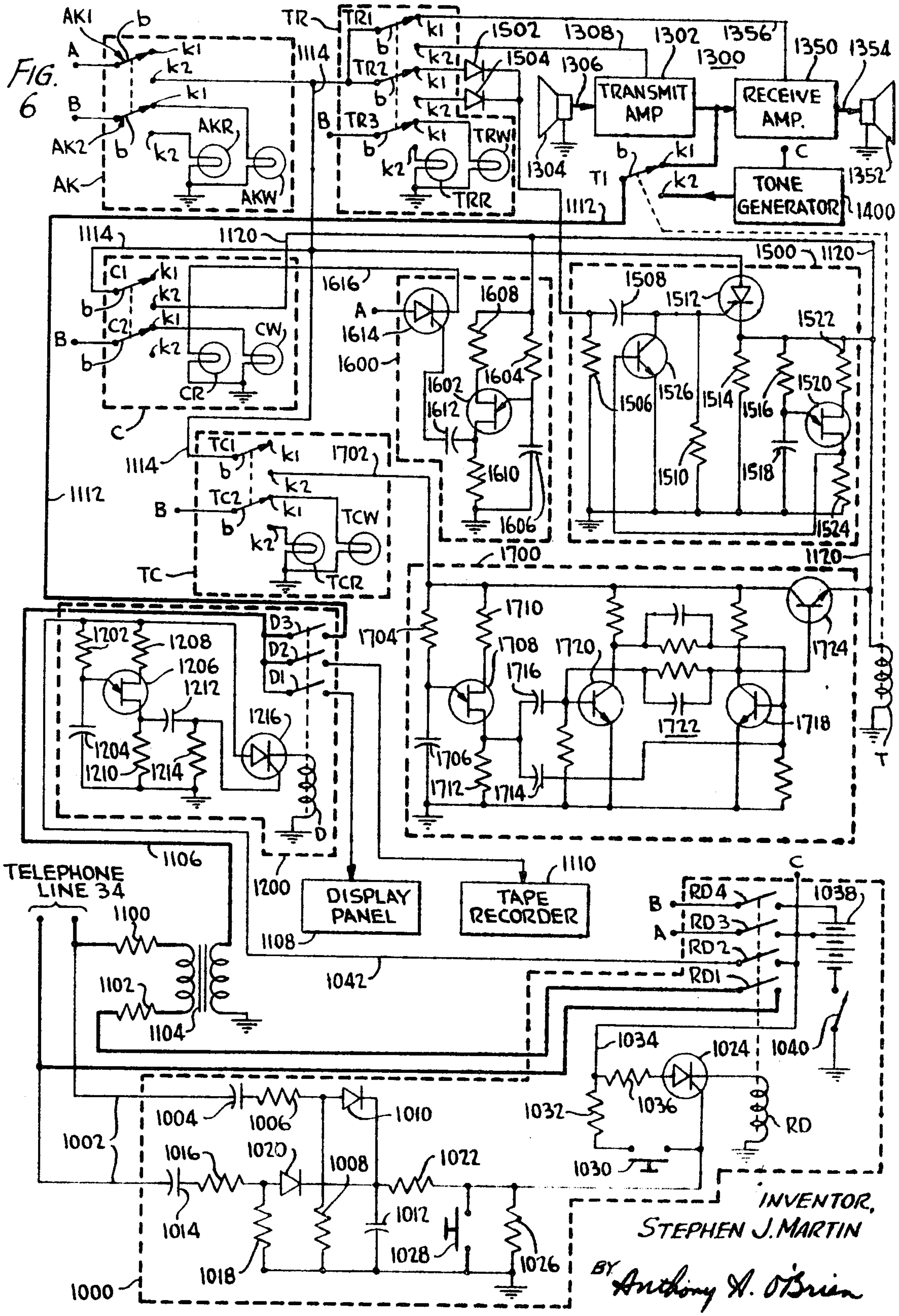
FIG. 6 is a schematic diagram of an operator station of the system of FIG. 1.

An operator station 32 of the system of FIG. 1 is shown in detail in FIG. 6 and includes a ringing detector circuit 1000 having input leads 1002 coupled directly across one of the central monitoring complex telephone lines 34. Ringing detector 1000 is coupled to one side of line 34 by a capacitor 1004 which is connected by resistors 1006 and 1008 to ground. A diode 1010 has its anode electrode coupled to the junction of resistors 1006 and 1008 and its cathode electrode connected to a capacitor 1012 which is returned to ground. The other side of telephone line 34 is coupled to a capacitor 1014 which is connected to ground by resistors 1016 and 1018. The junction of resistors 1016 and 1018 is coupled to the anode of a diode rectifier 1020 which has its cathode electrode coupled to the junction of diode 1010 and capacitor 1012. Diodes 1010 and 1020 are connected by a resistor 1022 to the gate electrode of a controlled rectifier 1024.

The gate of rectifier 1024 is coupled to ground by a resistor 1026 which has a manually operated normally open switch 1028 connected in parallel therewith so as to permit manual extinguishing of the rectifier. Rectifier 1024 also has its gate coupled by a serially connected normally open switch 1030 and a resistor 1032 to a power supply line 1034. Power supply line 1034 is connected to the anode of rectifier 1024 by a resistor 1036, and the cathode of the rectifier is returned to ground by a relay coil RD.

Power line 1034 is connected to an intermediate voltage terminal C of D. C. power supply 1038 which has its negative terminal connected to ground by a main power switch 1040. When a ringing signal is impressed on telephone line 34, a positive signal will be developed by diodes 1010 and 1020 at the gate of rectifier 1024 causing it to fire and conduct current through ringing detector coil RD to close a set of normally open relay contacts RD1, RD2, RD3 and RD4. Contacts RD3 and RD4 (as shown) control the flow of current from high and intermediate terminals of power supply 1038 to power points A and B, respectively, for energizing the remaining circuits of the operator station, as will be described below. Contacts RD1 are connected in series with one side of telephone line 34, both sides of which are coupled by resistors 1100 and 1102 across one winding of an isolating transformer 1104. A second winding of transformer 1104 has one end grounded and its other end coupled via input-output signal line 1106 to one terminal of a set of normally open relay contacts D1, D2 and D3 of a delay circuit 1200 which receives power from the intermediate voltage terminal of power supply 1038 through contacts RD2 of the ringing detector relay RD and power line 1042.

Delay circuit 1200 delays the connection of telephone line 34 with the rest of the operator station circuitry for a short time interval, which may be one second, for example, to assure decay of any switching transients which may appear on the line from the public telephone system subsequent to the connection of an incoming call. The delay circuit 1200 includes a resistor 1202 coupled between power line 1042 and a capacitor 1204 which is connected to ground. A unijunction transistor 1206 has its emitter electrode connected to the junction of resistor 1202 and capacitor 1204, and its two base electrodes coupled to power line 1042 and ground, respectively, by resistors 1208 and 1210. The junction of resistor 1210 and the base electrode of transistor 1206 is coupled by a capacitor 1212 to ground through a resistor 1214 and to the gate of a controlled rectifier 1216. Rectifier 1216 has its anode directly connected to power line 1042 and its cathode coupled to ground through a relay coil D which controls contacts, D1, D2 and D3. In this manner, relay coil D will become energized to close contacts D1, D2 and D3 after a short delay interval has elapsed subsequent to the detection of a ringing signal on telephone line 34 by the ringing detector circuit 1000.

When relay D is actuated, input-output line 1106 is coupled to a display panel 1108 and a conventional recorder 1110 by contacts D1 and D2, respectively. Display panel 1108 may include Nixie tubes or other suitable electrically controlled display devices designed to register coded signals transmitted from a remote location by a subscriber unit 22. It should be noted that any suitable tape recording device may be utilized with the present invention with the requirement that frequency response curves as well as input and output impedances of the recorder match the public telephone system characteristics so as to provide an accurate record of each alarm situation.

Input-output line 1106 is coupled by contacts D3 to signal line 1112 which is connected at its other end to a movable blade *b* of relay controlled switch T1. Switch T1 is responsive to relay coil T and includes fixed contacts *k*1 and *k*2 which are connected to an audio communication network 1300 and a tone generator circuit 1400, respectively. When relay coil T is not energized, blade *b* is mechanically biased against contact *k*1 to connect signal line 1112 to the junction of the output of a transmit amplifier 1302 and the input of a receive amplifier 1350. A microphone 1304 is connected by line 1306 to the input of the transmit amplifier to enable the station operator to convey audible messages over telephone line 34 when the transmit amplifier is supplied with operating potential from line 1308. Similarly, a speaker 1352 is coupled to the output of receive amplifier 1350 by line 1354 for reproducing audible sounds appearing on the telephone line whenever the receive amplifier is energized by voltage applied to line 1356.

When relay coil T is energized, switch T1 will be actuated and blade *b* will be moved away from contact *k*1 and against contact *k*2. In this position, the output from tone generator 1400 is applied to signal line 1112 where it is fed through contacts D3 and input-output line 1106 to the telephone line 34. Tone generator 1400 receives operating potential from the intermediate terminal of power supply 1038 via circuit point C and is thus always energized when main power switch 1040 is closed thereby assuring accurate tone frequency output signals for application to the telephone line upon receipt of an alarm call from one of the subscriber units 22.

A two position manually operable acknowledge switching unit AK includes first and second ganged switches AK1 and AK2. Switch AK1 has a blade *b*, coupled to power point A, and fixed contacts *k*1 (not connected) and *k*2. The acknowledge unit includes red and white display lamps AKR and AKW, respectively, each having one end grounded and the other end coupled to a respective one of fixed contacts *k*1 and *k*2 of switch AK2. The blade *b* of switch AK2 is connected to power point B for selectively energizing one of the lamps depending upon the position of the switch. Fixed contact *k*2 of switch AK1 is connected to controlled power bus 1114 which supplies operating voltage from point A to the rest of the operator station circuitry.

Power from the controlled bus 1114 is fed to a two position manually operable transmit-receive switching unit TR. The unit includes ganged switches TR1, TR2 and TR3 for controlling the direction of voice communication of both the operator station 32 and the subscriber unit 22, as will become clear below. Switch TR1 has a movable blade *b* connected to power bus 1114 and has first and second contacts *k*1 and *k*2 respectively connected to receive amplifier power line 1356 and transmit amplifier power line 1308. Switch TR2 has a movable blade *b*, also connected to bus 1114, and fixed contacts *k*1 and *k*2 each coupled to the anode electrode of a respective one of a pair of diodes 1502 and 1504. The cathode electrodes of diodes 1502 and 1504 are both connected to the input of a tone timer circuit 1500 to be described below. Switch TR3 includes contacts *k*1 and *k*2 respectively coupled to one side of white and red lamps TRW and TRR which have their other sides connected to ground. The movable blade *b* of switch TR3 is connected to power point B for selectively energizing the lamps.

The cathode electrodes of diodes 1502 and 1504 are coupled to the input of tone timing circuit 1500 at the junction of a resistor 1506, which has its other end grounded, and a capacitor 1508, which has its other end coupled to the junction of a grounded resistor 1510 and the gate electrode of a controlled rectifier 1512. Rectifier 1512 has its anode connected to power bus 1114 and its cathode coupled to ground by a resistor 1514 and further coupled via line 1120 to one terminal of relay coil T which has its other terminal returned to ground to complete a current path therethrough. A timing circuit is also coupled to the cathode of the controlled rectifier and includes an RC timing network formed by the series connection of a resistor 1516 and a capacitor 1518. The junction of resistor 1516 and capacitor 1518 is coupled to the emitter of a unijunction transistor 1520 having a first base coupled to the cathode of controlled rectifier 1512, and a second base coupled to ground by a resistor 1524 and further coupled to the base of a shunt control transistor 1526. The collector of transistor 734 is connected to the gate of rectifier 1512 while its emitter electrode is coupled to ground.

A normally actuated two position cancel switching unit C includes a first switch C1 having a blade *b*, coupled to power bus 1114, a fixed contact *k*1 (not connected) and a fixed contact *k*2 which is coupled via line 1120 to the above ground terminal of relay coil T. Contact *k*2 of switch C1 is also coupled to a cancel indication timing circuit 1600 at the input of a unijunction transistor 1602 controlled by an RC network formed by a resistor 1604 coupled in series with a capacitor 1606 from line 1120 to ground. The junction of resistor 1604 and capacitor 1606 is connected to the emitter of the transistor. A biasing network includes resistors 1608 and 1610 respectively coupled between a first base of the transistor and line 1120, and a second base of the transistor and ground. The second base of unijunction transistor 1602 is connected through a capacitor 1612 to the gate of a controlled rectifier 1614 which has its anode coupled to voltage point A and its cathode coupled to one terminal of a red lamp CR of cancel unit C by line 1616. The other terminal of lamp CR and one terminal of white lamp CW are connected to ground. The other terminal of the white lamp is connected to contact *k*1 of cancel switch C2 having a second contact *k*2 (not connected) and a movable blade *b* which is coupled to voltage point B. Cancel switching unit C is mechanically biased to the position shown in FIG. 6 so as to automatically revert to its inactive state after it has been depressed and then released.

The operator station 32 also includes a total cancel circuit 1700 controlled by a total cancel switching unit TC including a first switch TC1 having a blade *b* coupled to line 1114, a contact *k*1 (not connected) and a contact *k*2 coupled to a power line 1702. Switching unit TC also includes a second switch TC2 having a movable contact *b*, connected to voltage point B, and fixed contacts *k*1 and *k*2 respectively connected to white lamp TCW and red lamp TCR; lamps TCW and TCR are both returned to ground, as illustrated.

Total cancel circuit 1700 includes an RC timing network formed by a resistor 1704 coupled between line 1702 and a capacitor 1706 which is connected at its other end to ground. The junction of resistor 1704 and capacitor 1706 is connected to the emitter of a unijunction transistor 1708 having a first biasing resistor 1710 coupled from a first base to line 1702, and a second biasing resistor 1712 coupled from a second base to ground. The output from the second base of transistor 1708 is connected by capacitors 1714 and 1716 to the base electrodes of transistors 1718 and 1720 which form the two sides of a conventional flip-flop circuit 1722. Flip-flop 1722 has an output taken from the collector of flip-flop transistor 1718 and coupled to the base of an NPN transistor 1724. Transistor 1724 has its collector coupled to power line 1702 and its emitter connected by line 1120 to the above-ground side of relay coil T for controlling the position of switch T1.

Figures 7, 8:
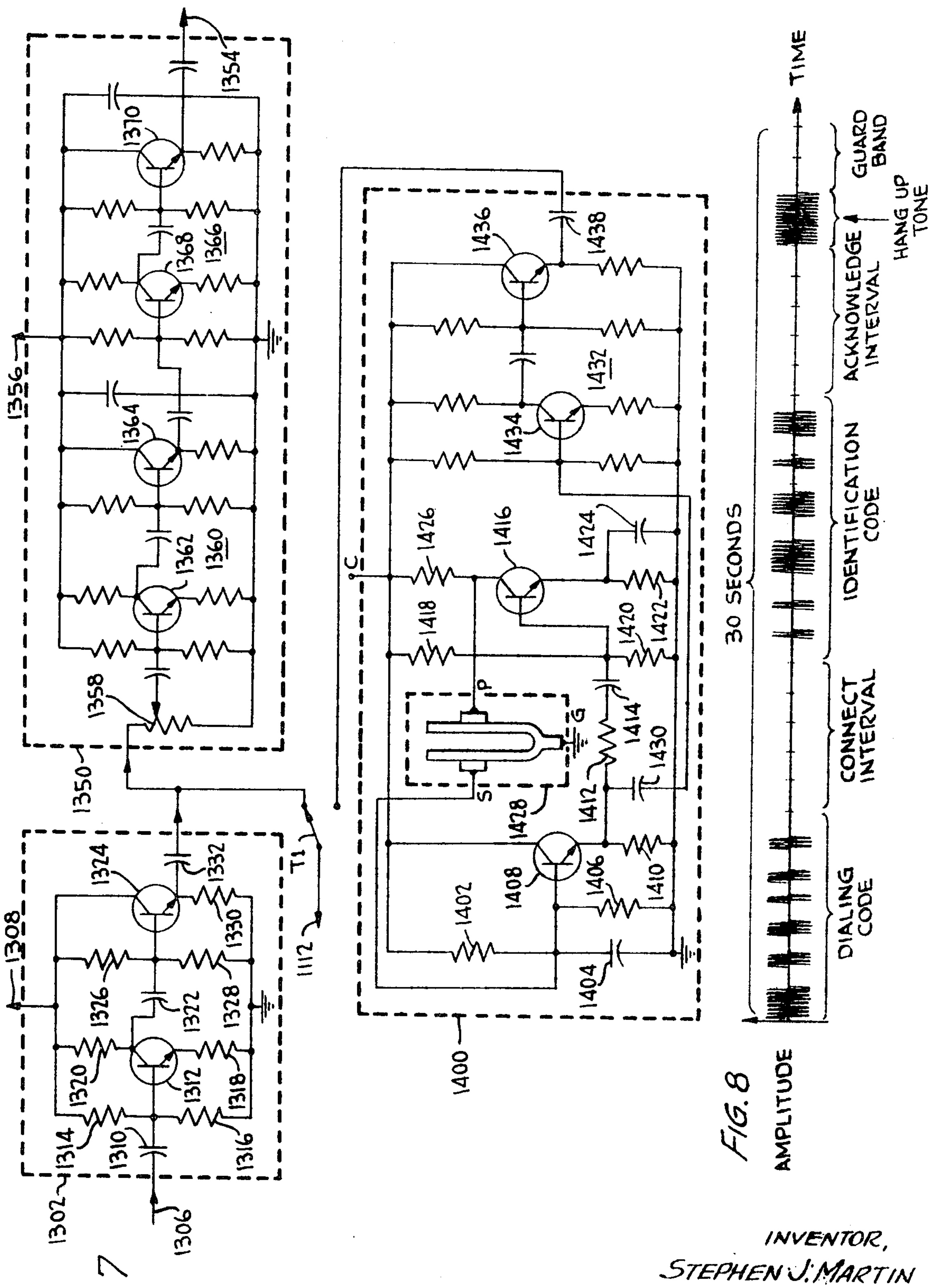
FIG. 7 is a schematic diagram of the transmit and receive amplifiers, and tone generator of FIG. 6.
FIG. 8 is an amplitude vs. time plot of information recorded on magnetic tape utilized by the subscriber unit of FIGS. 2 and 3.

Referring now to FIG. 7, transmit amplifier 1302 includes an input coupling capacitor 1310 coupled between microphone 1304 (FIG. 6) and the base of an amplifying transistor 1312. Biasing resistors 1314 and 1316 are connected from the base electrode of the transistor to transmit power line 1308 and ground, respectively. The emitter is grounded by biasing resistor 1318 while a fourth biasing resistor 1320 is coupled between power line 1308 and the collector. The output of transistor amplifier 1312 is taken from the collector and fed by a coupling capacitor 1322 to the base of an emitter-follower transistor 1324. The base of transistor 1324 is coupled to line 1308 by a biasing resistor 1326 and is further coupled to ground by a biasing resistor 1328. The transistor has its electrode coupled directly to line 1308 and its emitter electrode returned to ground by a resistor 1330 and additionally coupled to switch T1 and the input of receive amplifier 1350 by a coupling capacitor 1332.

The input of receive amplifier 1350 is connected to a level adjusting potentiometer 1358 having its wiper arm connected to the first of two cascaded amplifying stages 1360 and 1366 each substantially identical to transmit amplifier 1302. The first stage includes an amplifying transistor 1362 and an emitter-follower transistor 1364, while the second stage includes an amplifying transistor 1368 and an emitter-follower transistor 1370. The structural details of receive amplifier 1350 can be gleaned by reference to transmit amplifier 1302 and therefore will not be described in detail to avoid repetition.

Tone generator 1400 includes a resistor 1402 coupled in series with a capacitor 1404 from power point C to ground. The junction of resistor 1402 and capacitor 1404 is connected to ground through a resistor 1406 and to the base of a transistor 1408. The collector-emitter path of transistor 1408 is connected between power point C and one end of resistors 1410 and 1412. The other end of resistor 1410 is coupled to ground while the other end of resistor 1412 is connected by a coupling capacitor 1414 to the base of a transistor 1416. The base of transistor 1416 is also coupled to the junction of serially connected resistors 1418 and 1420 which are, in turn, connected between power point C and ground. The emitter of transistor 1416 is connected to ground by a parallel network formed by a resistor 1422 and a capacitor 1424. The collector electrode is connected to power point C by a resistor 1426 and is additionally connected to the primary side of a tuned resonant fork filter 1428. Filter 1428 has its secondary coupled back to the base of transistor 1408 so as to provide positive feedback causing the circuit to oscillate at the natural frequency of filter 1428. It is noted that any suitable type of filter circuit, such as a crystal filter or a tuned transformer may be used in place of filter 1428 in the present invention in accordance with operational characteristics desired in various particular applications. The output of the oscillating network is taken from the emitter of transistor 1408 and fed by coupling capacitor 1430 to an amplifier network 1432 identical to transmit amplifier 1302 and including an amplifying transistor 1434 and an emitter-follower transistor 1436. The amplified oscillations from tone generator 1400 are coupled by a capacitor 1438 to contact *k*2 of switch T1 as shown.

The operation of the overall system of the present invention will be described with the aid of FIG. 8 which is an amplitude vs. time plot illustrating the signals stored on the magnetic tape utilized with the tape deck 202 of the subscriber unit. The ends of the tape are connected so that an endless loop is formed and a full cycle of the stored information has a playing time of approximately 30 seconds. All the information stored on the tape is in the form of single frequency tone bursts at a frequency of approximately 1000 cycles per second which when fed through dialing circuit 200 cause dialing contacts K of the subscriber unit to momentarily open thereby transmitting pulse signals through the public telephone system 10.

When motor 204 (FIG. 2) of tape deck 202 is energized, a dialing code is generated by the tape for an interval of approximately 7 seconds. The tone bursts recorded on the dialing code portion of the tape are spaced to conform to public telephone system standards and correspond to the telephone number of the central monitoring complex 30. Following the dialing code, a connect interval of approximately 5 seconds is provided where no signal appears on the tape. This allows the subscriber unit 22 to wait for the public telephone system to make the connection to the central monitoring complex. After the connect interval has elapsed and the call to the central complex has been made, a 9 second identification code is generated by the tape to notify an operator at one of the operator stations 32 of the identity of the calling subscriber. There follows a period of 5 seconds, after the identification code has been transmitted, with no information on the tape to allow the operator to acknowledge receipt of the call. Following the acknowledge interval is a two second hang-up tone interval, after which is provided a 2 second guard band with no signal on the tape. The function of the above described stored information signals will be more fully explained below as the sequence of operation of the overall system is described.

The controlled rectifier used in both the subscriber unit and the operator station of the present invention may take any number of forms, such as silicon controlled rectifiers (SCR), thyristors and PNPN gate controlled switches (GCS), for example, the only requirements being that each of the devices have the capability of being turned on by a signal momentarily applied to its gate electrode and that it remain on thereafter until the gate is shunted to ground or fed with a negative pulse. It is important to note that many conventional SCR devices can be effectively extinguished, after they have been latched on, by grounding the gate electrode as in the present circuit. Since the gate electrode potential is high when the device is conductive, and since the internal capacity of the SCR is in many cases of considerable value, grounding of the gate electrode effectively impresses a negative pulse thereacross which causes the device to revert back to its non-conductive condition. Of course, other techniques of extinguishing the various controlled rectifiers utilized in the preferred embodiment of the present invention may be employed, as desired, such as by directly shunting the anode-cathode path of the device or by momentarily removing anode potential therefrom.

To place the subscriber unit 22 of the present invention in a standby state, main power switch 104 (FIG. 2) is closed to apply power to controlled rectifier 108 and transistor 116. Prior to the occurrence of an alarm condition, sensor contacts 100 are open to isolate the gate of rectifier 108 from potential source 102. The controlled rectifier therefore remains in a non-conductive state causing the potential of the base electrode of transistor 116 to be zero thereby maintaining the transistor off. Thus, positive voltage from power supply 102 is blocked by the transistor from energizing any of the subscriber unit circuitry including relay coil R. Since relay coil R is deenergized, dialing contacts K are open (as shown in FIG. 3) and the subscriber unit is isolated from the telephone line 26.

At this time, that is, prior to the receipt of an alarm call, operator station 32 (FIG. 6) is also in a standby state with all circuits isolated from power source 1038 by open switches RD2, RD3 and RD4 except for the ringing detector circuit 1000 and the tone generator 1400 which are both directly energized from the intermediate terminal C of the power supply. Since switch RD1 is also open, telephone line 34 is disconnected from input-output line 1106 and the remainder of the station circuitry; however, the ringing detector circuit is connected directly across the line so as to detect any incoming calls. It should be noted that the tone generator is maintained on at all times so that stable tone signals will be available during alarm conditions.

Referring now to FIGS. 2 and 3, in the event of an alarm condition at a subscriber's location 20, sensor 24 is either automatically or manually actuated to close contacts 100 and conduct positive voltage through pulse forming capacitor 106 to the gate of controlled rectifier 108 which fires and causes its cathode potential to increase. Since the rectifier will remain on after the gate trigger pulse is removed, the unit is self-latching and only momentary closure of sensor switch 100 is necessary to initiate an alarm call. The increased cathode potential is seen by the base of transistor 116 through resistor 114 which is thereafter renderred conductive to supply operating potential over main power bus 124 ( and point A ) to the anodes of controlled rectifiers 120 and 136, dialing circuit 200, tape reset circuit 300, cancel circuit 500, transmit-receive logic circuit 600 and tone receiver circuit 900.

The positive voltage at the dialing circuit 200 will be coupled via resistor 228 and 224 to dialing relay R and transistor 220 which turns on transistor 232 to provide a return path for energizing the dialing relay. With relay R energized, dialing contacts K (FIG. 3) become closed to connect telephone line 26 to the circuit. At the same time, when rectifier 108 fires to turn on transistor 116, a positive pulse is developed by capacitor 118 to fire controlled rectifier 120 which then provides a current path from the emitter of transistor 116 over line 122 and resistor 132 to the base of transistor 130 causing it to become conductive. Positive operating potential from source 102 is then fed through transistors 116 and 130 to power line 134 which is connected to total cancel circuit 400, the base of inhibit transistor 658 of the transmit-receive logic circuit 600, and dial tone sensor 800.

At this point, all circuits except for the tape deck 202 are active, the telephone line 26 is connected to the subscriber unit through contacts K, and the dial tone sensor 800 is standing by to detect the presence of a dial tone on the line. When the dial tone appears, it is fed through the hybrid bridge 710 (FIG. 3) and over signal line 712 to amplifier transistor 806 of the dial tone sensor 800 (FIG. 5). The amplified dial tone is rectified as a positive voltage by diodes 818 and 820, filtered by capacitor 822, and shaped to form a positive square-wave by transistors 824 and 826. The negative square-wave is then coupled over line 802 to the gate of controlled rectifier 136. Controlled rectifier 136 then fires causing transistor 142 to become conductive to apply positive voltage over power bus 146 to the tape deck 202.

Tape deck motor 204 is energized by current flowing from power source 102 through main power switch 104, transistor 116, transistor 142 and the motor to ground. Operation of the motor drives the endless tape loop past tape head 208 whereupon the 7 second tone burst dialing code is picked-up by the tape head, is amplified by amplifier 210, rectified as a negative voltage by diodes 214 and 216, filtered by capacitor 218 and applied to the base of transistor 220. The negative voltage produced by the dialing circuit in response to the presence of tone burst signals on the magnetic tape opposes the positive voltage fed to the base of transistor 220 by resistors 228 and 224 from power bus 124 and causes the transistor to turn off. When transistor 220 turns off, transistor 232 becomes non-conductive and opens the current return path for relay coil R to release dialing contacts K. In this manner, the recorded short duration dialing tone bursts corresponding to the telephone number of the central monitoring complex 30 selectively de-energize dialing relay coil R to momentarily open the subscriber telephone line 26 and thereby apply a series of pulses to the public telephone system 10 to place a call to the central complex 30.

When the dialing sequence has terminated, the tape motor continues to drive the tape past tape head 208. However, since a five second blank interval follows the dialing code on the tape, the subscriber unit will not transmit any signals through the telephone lines and, in effect, will wait for the switching apparatus of the public telephone system 10 to complete the connection from the subscriber unit to one of the operator stations 32 of the central monitoring complex 30.

Referring now to FIG. 6, toward the end of the five second interval, the public telephone system apparatus will have completed the telephone connection and will apply a ringing signal to line 34 of the central monitoring complex 30 indicating that a subscriber unit has detected an alarm condition and has dialed the central complex. The ringing signal is sensed by ringing detector 1000 wherein a positive signal is developed at the gate of controlled rectifier 1024 by rectifying diodes 1010 and 1018 and filter capacitor 1012. The positive rectified signal causes the controlled rectifier to fire thereby enabling a current flow path to relay coil RD which causes switches RD1, RD2, RD3 and RD4 to close. Switch RD1 connects telephone line 34 with the operator station circuitry, and switches RD2, RD3 and RD4 apply positive operating voltage to delay circuit 1200, intermediate power point A, and power point B, respectively. Thus, all circuits at the operator station become energized and white lamps AKW, TRW, CW and TCW of the switching units become lit. Since telephone line 34 is now connected to the station, the public telephone system 10 will detect the answering of the call and will cease transmission of the ringing signal. In order to prevent transient signals generated by the ringing generator and switching circuits of the public telephone system from affecting the operator station circuitry, the input-output signal line 1106 from transformer 1104 is isolated from the station by normally open switches D1, D2 and D3 of one second delay circuit 1200.

In operation, the delay circuit receives operating potential through switch RD2 of the ringing detector 1000 at the same time as telephone line 34 is connected to the station to initiate the charging of capacitor 1204 through resistor 1202. When approximately one second has elapsed and sufficient voltage has built up across capacitor 1204, unijunction transistor 1206 will fire causing a triggering pulse to be applied to the gate electrode of controlled rectifier 1216 by capacitor 1212. The rectifier then conducts current through its anode-cathode path from input-output line 1006 to the other circuits of the operator station. More specifically, signals on input-output line 1106 are applied through switch D1 to a display panel 1108, through switch D2 to a conventional tape recorder 1110, and through switch D3 to signal line 1112 which is connected to blade *b* of switch T1. The blade of switch T1 is normally biased against contact *k*1, as shown, to couple signal line 1112 to transmit and receive amplifiers 1302 and 1350, respectively. Thus, when a call comes in to the operator station, the ringing detector 1000 senses the ringing signal, seizes the telephone line and energizes a 1 second delay circuit which, in turn, connects the operator station circuitry to the telephone line.

After the 5 second connect interval has elapsed and the operator station has received the call, the magnetic tape at the subscriber unit (FIGS. 2 and 3) will then generate a nine second subscriber identification code as it continues its travel past tape head 208. The identification code is in the form of tone burst signals, similar to the above-mentioned dialing code signals, which produce corresponding identification pulses on the subscriber telephone line 26 by selectively deenergizing dialing relay R to open dialing contacts K. At the operator station (FIG. 6), the identification pulses appear on telephone line 34 and are coupled through transformer 1104, input-output signal line 1106, and switches D1 and D2 of delay circuit 1200 to tape recorder 1110 and display panel 1108. The tape recorder stores all signals which appear on input-output line 1106 to provide a complete record of every alarm condition received at the operator station 32. Display panel 1108 receives the identification pulses from the telephone line and generates a visual pattern by counting and display techniques to notify the station operator of the identity of the calling subscriber unit. Of course, any conventional tape recorder and any of various display circuits, such as Nixie tube display modules or conventional filamentary lamp banks, may be utilized with the present invention depending upon the particular installation.

Upon completion of the identification code transmission by the subscriber unit, the tape deck continues to operate and the acknowledge interval of the tape loop is driven past the tape head. Since no tone burst signals are recorded on the tape during this 5 second interval, dialing contacts K remain closed and the subscriber unit effectively waits for an acknowledge signal from the operator station. If the station operator fails to acknowledge the call within the five second acknowledge interval of the tape loop, the tape will continue to move until the continuous 2 second hang-up tone is picked-up by tape head 208, amplified by amplifier 210, and detected as a negative voltage by diodes 214 and 216 and capacitor 218. The negative voltage turns off transistor 220 which turns off transistor 232 and deenergizes relay R for 2 seconds. This causes the release of dialing contacts K which opens the connection to telephone line 26 for two seconds and hangs-up the subscriber unit.

The reduction in the voltage level of the base of transistor 220, caused by the negative output voltage from the tape deck 202 during the two second hang-up interval of the tape loop, also causes a reduction in the voltage level of the base of the first transistor 304 of tape reset circuit 300. The reduced voltage on transistor 304 causes it to turn off which then turns on transistor 308 to conduct positive operating potential from power point A to timing network 310. Capacitor 316 will then build up a charge which after a 1.5 second delay will fire unijunction transistor 318 to trigger controlled rectifier 326 through capacitor 324 and initiate another 1.5 second timer 334. After timer 334 fires, an output signal will be coupled by line 338 to the base of transistor 328 causing it to conduct and thereby turn off controlled rectifier 326 to place the reset circuit 300 back in its standby mode. The output signal also is coupled by line 340 to the base of transistor 138 causing it to conduct and extinguish rectifier 136 which then turns off transistor 142 to remove operating potential from tape deck 202. Since the output from the tape reset circuit 300 is produced 3 seconds after the start of the 2 second hang-up tone, the tape will be stopped in the middle of the two second blank guard band (FIG. 8). In this manner, the tape is accurately reset for a subsequent cycle thereby minimizing the possibility of false dialing. It is noted that timing network 310 of the reset circuit 300 will fire controlled rectifier 326 only after the timer has been coupled to power point A by transistor 308 for at least 1.5 seconds. If power is removed prior to the 1.5 second interval, the timer will not fire and the tape reset circuit will not produce an output signal. For this reason, the tape reset output signal cannot be produced by dialing or identification code tone burst signals and is responsive only to the two second hang-up tone from the tape loop.

Since tape reset circuit 300 only extinguishes rectifier 136 to remove power from the tape deck 202, the rest of the circuits of the subscriber unit remain energized after the 2 second hang-up interval. In addition, as soon as the two second hang-up tone from the tape loop ceases, the negative output signal from diodes 214 and 216 of dialing circuit 200 is removed, and the base voltage of transistor 220 increases to turn on transistors 220 and 232 to re-energize relay coil R. With relay coil R energized, once again, the dialing contacts K become closed and a connection is reestablished to the telephone line 26. The dial tone sensor 800 then waits for the receipt of a dial tone signal from the public telephone system 10 to reinitiate the dialing sequence described above. This cyclic dialing action will continue until an operator at the central monitoring complex 30 acknowledges receipt of the call during the five second acknowledge interval of the tape.

Referring to FIG. 6, the station operator acknowledges receipt of the alarm call by depressing two-position acknowledge switching unit AK so that blades *b* of switches AK1 and AK2 are moved from contacts *k*1 to contacts *k*2. Movement of the blade *b* of switch AK2 causes the white lamp AKW to go out and the red lamp AKR to be lit, while the connection of blade *b* of switch AK1 to contact *k*2 applies operating potential from power point A to main power bus 1114 which is coupled to blades b of transmit-receive switches TR1 and TR2, cancel switch C1, and total cancel switch TC1 as well as to the anode electrode of controlled rectifier 1512 of tone timer circuit 1500.

The application of positive operating voltage from switch AK1 to blades *b* of switches C1 and TC1 have no effect on the circuit since the blades thereof are spring biased against fixed contacts *k*1 which have no connection with the rest of the circuit. However, positive potential from acknowledge switch AK1 will be fed via power bus 1114 through blade *b* and contact *k*1 of transmit-receive switch TR2 and diode 1502 to the input of tone timer circuit 1500. The positive voltage level fed through diode 1502 will be formed into a positive pulse by capacitor 1508 of the timer circuit to thereby trigger controlled rectifier 1512 into its conductive state. Since positive operating potential was previously applied to the anode of the rectifier 1512, current will be conducted through the anode-cathode path thereof when the positive triggering pulse from capacitor 1508 is applied. The current flow through the rectifier device is fed over line 1120 to the above-ground terminal of relay coil T which then causes blade *b* of switch T1 to move from its contact *k*1 to contact *k*2. In this manner, the tone signal output from tone generator 1400 is applied through switch T1, line 1112, switch D3, and input-output line 1106 to the telephone line for as long as relay coil T remains energized by current from the controlled rectifier 1512. The duration of the conductive period of rectifier 1512 is determined by a unijunction transistor timing network in the tone timing circuit 1500 which includes resistor 1516 and capacitor 1518. When the rectifier 1512 fires, the voltage appearing across capacitor 1518 gradually increases as the capacitor builds up a charge until the firing level of unijunction transistor 1520 is reached. In the preferred embodiment, a time interval of approximately 0.2 seconds will elapse before the transistor fires. When transistor 1520 becomes conductive, a positive signal will be fed back to the base of extinguishing transistor 1526 which shunts the gate of rectifier 1512 to ground thereby effectively impressing a negative pulse on the gate-cathode path of the controlled rectifier which then turns off. With the rectifier 1512 in its non-conductive state, current flow through line 1120 ceases and relay coil T is deenergized causing switch T1 to drop back to its normal position as illustrated in the Figure. Thus, tone signals from generator 1400 are applied to the telephone line for a timed interval determined primarily by the component values of resistor 1516, capacitor 1518, and the firing level of unijunction transistor 1520 of the tone timer circuit 1500.

While any tone generator can be utilized to provide audio tone signals at the operator station, a preferred circuit is shown in detail in FIG. 7. Tone generator 1400 includes first and second oscillator transistors 1408 and 1416 having a positive feedback coupling path through tuned filter 1428 to establish stable oscillations at the natural frequency of the filter. The output of the oscillator transistor is coupled through capacitor 1430 to an amplifier network 1432 including amplifying transistor 1434 and emitter-follower transistor 1436. The output from the amplifier is an amplified audio frequency tone signal which, in the preferred embodiment, has a frequency of approximately 2900 cycles per second and is fed to switch T1 through a coupling capacitor 1438.

Referring back to FIG. 6, after the 0.2 second time interval of energization of relay coil T by the tone timer circuit 1500 has elapsed, switch T1 reverts to its normal position to remove the tone generator 1400 from line 1112 and connect the common junction of transmit amplifier 1302 and receive amplifier 1350 in its place. Since transmit-receive switch TR1 applies positive operating voltage from power bus 1114 to contact *k*1 thereof in its normally biased receive position as shown, the receive amplifier 1350 will be energized by the positive voltage appearing on line 1356 and the transmit amplifier 1302 will be off. In this manner, upon depressing the acknowledge switch, the operator transmits a 0.2 second tone burst from the tone generator 1400 through the public telephone system and automatically energizes the operator station receive mode for enabling audible reproduction of signals appearing on telephone line 34 by speaker 1352. It is noted that the audio sounds on the telephone line 34 are coupled through switch RD1 and transformer 1104, input-output line 1106, switch D3, line 1112 and switch T1 to the input of the receive amplifier 1350; to clarify the present description, the signal and control tone path of the operator station is shown by heavy lines in FIG. 6.

Thus, during the 5 second acknowledge interval, the station operator by actuating the acknowledge switching unit Ak applies a 0.2 second 2900 cycle per second tone burst to the telephone line, and automatically conditions the operator circuitry for the reception of audio signals to enable the station operator to audibly monitor sounds transmitted from the subscriber unit location over the public telephone system lines.

Referring again to the subscriber unit in FIGS. 2 and 3, the 0.2 second 2900 cycle per second tone burst signal from the operator station will be coupled from telephone line 26 to signal input line 712 by the hybrid bridge circuit 710. The tone burst is then fed to the input of tone receiver circuit 900 (FIG. 5) wherein it is amplified by transistor 904, filtered by tuned filter 916, detected by transistor 290, diodes 930 and 932, and capacitor 934, and then shaped by transistors 936 and 938 to produce a positive square-wave output signal on command signal line 150 having a duration of approximately 0.2 seconds. Filter 916 is tuned to the 2900 cycle per second frequency of the operator station tone generator 1400 and will reject all other input signals. Therefore, command signals are only fed to line 150 by tone receiver 900 in response to tone signals transmitted by the operator station.

The positive command pulse is fed by command signal line 150 and resistor 139 (FIG. 2) to the base of shunt transistor 138 which extinguishes rectifier 136 and renders the series regulating transistor 142 non-conductive. In this manner, operating potential is removed from the tape deck unit 202 causing tape deck motor 204 to stop thereby assuring no further interruption of the dialing relay coil R. The 0.2 second command pulse from the tone receiver 900 is also coupled by resistor 127 to the base of shunt transistor 126 which then ceases conduction to thereby extinguish rectifier 120 and turn off the series control transistor 130. With transistor 130 off, power is removed from power bus 134 to turn off the dial tone sensor circuit 800 and total cancel circuit 400 and, in addition, remove the transmit-receive inhibiting voltage from the base of transistor 658 of the transmit-receive logic circuit 600 (FIG. 3).

With the positive voltage removed from the base of transistor 658, the transistor turns off and its collector potential increases. The increased collector potential of transistor 658 is coupled by resistor 654 to the base of transistor 652 which is thereby turned on to apply power to bus 644 of the transmit-receive flip-flop circuit. Since capacitor 650 is coupled from power bus 644 to the base of flip-flop transistor 640, the flip-flop circuit comes on with transistor 640 in its conductive state and transistor 636 in its non-conductive state. As a result, the collector of transistor 640 is very nearly at ground potential causing the switching transistor pair 664–666 to isolate receive enable line 670 from power point A. Furthermore, since transistor 636 of the flip-flop is off, its collector is at high potential causing the switching transistor pair 660–662 to be switched on for coupling power from point A to transmit enable line 668.

The positive operating potential on enable line 668 is fed to transmit amplifier circuit 702 which will then amplify any sounds picked up at the subscriber location by speaker-microphone 708 and apply them to the telephone line 26 through hybrid bridge circuit 710.

To summarize the system operation during the five second acknowledge interval, when the station operator at the central monitoring complex actuates the acknowledge switching unit AK, the operator station will be automatically placed in a receive mode of operation for audibly reproducing communication signals appearing on the telephone line 34. In addition, a 0.2 second tone burst is sent through the telephone network to the subscriber unit. Upon receipt of the 0.2 second tone burst at the subscriber unit, a 0.2 second command signal is generated by tone receiver 900 and fed via command signal line 150 to transistors 126 and 138 to remove operating potential from power buses 134 and 146. As a result, tape deck 202 is turned off, the dial tone sensor and total cancel circuits 800 and 400, respectively, are also turned off and the transmit-receive logic circuit 600 is converted from its previously inhibited condition to a transmit enable mode for applying power over transmit enable line 668 to the transmit amplifier 702. After the above-mentioned sequence of events has taken place, any sounds produced at the subscriber location 20 (FIG. 1) will be picked up by speaker microphone 708, amplified by transmit amplifier 702, and coupled to the telephone line 26. After passing through the public telephone system 10 the audible sounds will appear on telephone line 34 of the operator station unit 32 wherein they are fed by transformer 1104, input-output line 1106, delay switch D3, line 1112 and switch T1 to the input of operator station receive amplifier 1350 and audibly reproduced by speaker 1352.

If the station operator desires to terminate the transmit mode of the subscriber unit and initiate a receive condition so that audible instructions may be transmitted from the central monitoring complex to the subscriber, the transmit-receive switching unit TR is actuated so that blades *b* of switches TR1, TR2 and TR3 are moved from contacts *k*1 to contacts *k*2. The movement of switch TR1 causes operating potential to be removed from receive power line 1356 and applied to transmit power line 1308 for energizing the transmit amplifier 1302.

The operator can thereafter send messages along the telephone lines by speaking into microphone 1306 which feeds its output signals through the energized transmit amplifier 1302 to switch T1. The amplified signals from the amplifier 1302 will then be coupled to the operator station telephone line 34 through contact *k*1 and blade *b* of the switch T1, line 1112, switch D3 of delay circuit 1200, input-output signal line 1106, transformer 1104, and switch RD1. Thus, by actuating the transmit-receive switch TR1, the operator disables the receive amplifier 1350 and simultaneously enables transmit amplifier 1302 to establish voice communication from the operator station to the subscriber unit through the public telephone system.

By depressing transmit-receive switching unit TR, the operator also transmits a command signal to the subscriber for converting the subscriber unit from its transmit mode to its receive mode. The command signal is produced by the movement of blade b of switch TR2 from contact *k*1 to contact *k*2 for applying operating potential from bus 1114 through diode 1504 to the input of the 0.2 second tone timer circuit 1500. The tone timer will energize relay coil T for 0.2 seconds to move blade *b* of switch T1 from contact *k*1 to contact *k*2 for applying a tone burst signal from generator 1400 to the telephone line 34. In addition, the actuation of switching unit TR causes blade *b* of switch TR3 to move from contact *k*1 to contact *k*2 to thereby extinguish white lamp TRW and energized red lamp TRR. The red lamp thus indicates that the operator station is in a transmit mode and that a 0.2 second tone burst has been sent to the subscriber unit over the public telephone system for converting the subscriber circuitry from its transmit state to its receive condition.

Referring now to the subscriber unit shown in FIGS. 2 and 3, the 0.2 second tone burst sent by the station operator will appear on subscriber line 26 whereupon it is fed through the hybrid bridge 710 and line 712 to the tone receiver 900. The tone receiver detects the 0.2 second tone signal and produces a 0.2 second positive square-wave command pulse coupled by command signal line 150 to the input side of a coupling capacitor 602 in the transmit-receive logic circuit 600. Capacitor 602 couples the pulse to a waveshaping network formed by transistors 606 and 612 which directs the pulse through an RC differentiator 616-618 to the input steering gate of the transmit-receive logic flip-flop circuit. Since the flip-flop was previously in its transmit state; i. e. transistor 636 was off and transistor 640 was on, the input pulse will be fed through forward biased diode 622 to the base of transistor 636 which will then be renderred conductive. With transistor 636 conductive, its collector voltage is reduced to near ground potential causing switching transistors 660 and 662 to turn off and remove operating potential from transmit enable line 668. Similarly, when transistor 636 turns on and its collector potential decreases, the voltage at the base electrode of transistor 640 also decreases causing it to be renderred non-conductive. This isolates the collector electrode of transistor 640 from ground producing a positive voltage level at its collector which turns on switching transistors 664 and 666 to apply operating potential to receive enable line 670. With power on line 670, tone filter circuit 704 and receive-amplifier circuit 706 are energized to provide control tone rejection and audio signal amplification, respectively, for incoming communication messages from the central monitoring complex. Therefore, the subscriber unit responds to the 0.2 second command tone burst by switching from its transmit mode to its receive mode.

When the operator at the central monitoring complex again desires to monitor sounds at the calling subscriber unit, the transmit-receive switching unit TR (FIG. 6) is actuated so as to move blades b of switches TR1, TR2 and TR3 back to the position illustrated. When the switching unit is actuated, switch TR1 removes power from transmit amplifier power line 1308 and applies it once again via line 1356 to the receive amplifier 1350. In addition, switch TR2 applies a positive signal through diode 1502 to the tone timer circuit 1500 which then actuates relay coil T for a period of approximately 0.2 seconds to move blade *b* of switch T1 and apply a 0.2 second tone burst from tone generator 1400 to the telephone line 34. The 0.2 second tone burst will then be transmitted through the public telephone system 10 to the subscriber unit telephone line 26 whereupon it is coupled via line 712 (FIGS. 2 and 3) to the input of the tone receiver circuit 900. As before, the tone receiver produces a 0.2 second positive square-wave command pulse which is coupled to the transmit-receive logic circuit 600 over command signal line 150. The incoming pulse is fed through waveshaping network 606–612 and differentiator 616–618 which will switch back to its transmit state with transistor 636 off and transistor 640 on. Operating potential will therefore be removed from receive enable line 670 by switching transistors 664 and 660 and will be applied to transmit enable line 668 by switching transistors 660 and 662. In other words, by actuating the transmit-receive switching unit TR back to the position illustrated in FIG. 6, the receive amplifier 1350 of the operator station 32 is enabled while at the same time a 0.2 second tone burst is fed to telephone line 34 for converting the subscriber unit from its receive mode to its transmit mode. Thereafter, the station operator at the central monitoring complex will be able to listen at speaker 1352 to the sounds picked up by the speaker-microphone 708 of the subscriber unit 22. In this manner, the operator at the central complex has complete control over the direction of communication between the subscriber unit and the operator station and can converse back and forth repeatedly until all desired audio information has been exchanged.

After the operator at the central complex has no further need for communication with the calling subscriber's unit 22, the cancel switching unit C is actuated to apply operating potential from power bus 1114 through blade *b* and contact *k*2 of switch C1 and line 1120 to the above-ground terminal of relay coil T. The cancel switching unit C is spring biased to the position shown in FIG. 6 so that upon release of the switch, the energizing potential for relay coil T will be removed. When cancel switch C1 is actuated and relay coil T is energized, blade *b* of switch T1 will be moved against contact *k*2 to apply the 2900 cycle per second tone signal from generator 1400 to the telephone line 34. The tone signal will appear on the telephone line 34 as long as cancel switch C1 is maintained in its actuated position. As will become clear below, the cancel switch C1 must be maintained actuated for a period of approximately 10 seconds duration to cancel the subscriber call. In order to indicate to the operator when the ten second interval has elapsed, a 10 second cancel timing circuit 1600 is provided. When switch C1 is actuated, the operating potential on line 1120 initiates operation of a unijunction transistor timer in the cancel timing circuit 1600. Capacitor 1606 of the timing unit builds up a charge which will be sufficient to fire unijunction transistor 1602 after a ten second interval has elapsed; when transistor 1602 fires, controlled rectifier 1614 will be renderred conductive thereby applying operating potential from power point A to red lamp CR. In this manner, when the cancel switching unit C is actuated, the white lamp CW will be extinguished by the action of switch C2 and ten seconds later red lamp CR will be energized by the cancel timing circuit 1600. The energizing of red lamp CR notifies the operator that the cancel switching unit C has been actuated for a sufficient length of time to cause cancelling of the subscriber unit call, and the cancel switch can thereafter be released.

With reference to the subscriber unit, the 10 second tone transmitted by the control station operator will appear on telephone line 26 and will be coupled by hybrid bridge 710 and signal line 712 to tone receiver 900 whereupon it will be converted to a positive square-wave having a ten second duration. The ten second pulse is fed by command signal line 150 to cancel circuit 500 wherein it initiates operation of sawtooth generator 504 which, after approximately seven to ten seconds, builds up a voltage level sufficient to turn on transistors 512 and 514 and breakdown Zener diode 518. When Zener diode 518 breaksdown, a positive voltage is applied through waveshaping transistors 522 and 528 to line 532 which is fed back to the base of shunt control transistor 110. The positive signal on the base of transistor 110 renders it conductive to extinguish controlled rectifier 108 and turn off transistor 116. With transistor 116 off, all power is removed from the subscriber unit main power bus 124 and dialing relay R becomes deenergized. As a result, dialing contacts K open, and the subscriber unit telephone line 26 is thereby released. The subscriber unit is thus canceled from the line and will thereafter remain in a stand-by state for the receipt of a subsequent alarm condition sensed by one of the sensors 24.

After the operator has transmitted the 10 second cancel tone signal and the subscriber unit has been disconnected from the telephone system, switch 1028 of the ringing detector circuit 1000 is depressed to thereby extinguish controlled rectifier 1024 and remove electrical energization from coil RD which releases switches RD1 through RD4. The opening of switch RD1 causes the release of telephone line 34 and effectively hangs-up the operator station from the telephone system 10. In addition, the opening of switches RD2, RD3 and RD4 remove all operating potential from the operator station circuitry except for the energizing current flowing directly from intermediate point C of power source 1038 to line 1034 of the ringing detector circuit and to the tone generator circuit 1400 via power point C. At this point, both the subscriber unit and the operator station are returned to their standby conditions for the receipt of a subsequent alarm. It is noted that a switch 1030 is provided in the ringing detector 1000 to permit manual arming of rectifier 1024 for energizing the operator station for test purposes, for example.

In the event of a malfunction in the condition responsive sensor 24 of the subscriber unit 22, the operator at the control station 32 is provided with a total cancel circuit 1700 for disabling the dialing relay R of the subscriber unit to prevent the subscriber unit from repeatedly calling the central monitoring complex immediately after the operator has canceled a previous call. When the operator recognizes that the condition responsive sensor 24 is faulty and, as a result, is continuously triggering controlled rectifier 108, total cancel switching unit TC may be actuated. When actuated, blade *b* of switch TC1 will be moved from contact *k*1 to contact *k*2 to thereby apply operating potential from bus 1114 to power line 1702 of the total cancel circuit 1700. In operation, the total cancel circuit 1700 will cause alternate energization and deenergization of relay coil T for half second intervals. The alternate half second actuation of the relay T causes switch T1 to be moved between contacts *k*1 and *k*2 during each half second period. In this manner the 2900 cycle per second tone signal output from tone generator 1400 is alternately applied to the operator station telephone line 34 for half second intervals.

Referring more specifically to the operation of the total cancel circuit 1700, when a positive signal is applied to line 1702, a charge will begin to build up across capacitor 1706 to fire unijunction transistor 1708. At the end of a one-half second interval, the charge across capacitor 1706 will be sufficient to fire the transistor which will then apply a positive pulse to the input of flip-flop circuit 1722 and will discharge the capacitor. The capacitor will again build up a charge to fire the unijunction transistor 1708 at the end of the next one-half second interval. The flip-flop will therefore alternately change states so that the collector electrodes of each of the two flip-flop transistors 1718 and 1720 will be alternately tied to ground and to power line 1702. A series switching transistor 1724 has its collector-emitter path coupled between power line 1702 and relay coil T and its base electrode coupled to the collector of flip-flop transistor 1718. Thus, as the flip-flop alternately changes states every half second, transistor 1724 will alternately be renderred conductive and non-conductive. In this manner, relay coil T will be alternately energized to apply a pulse train of half-second tone burst signals from tone generator 1400 to the telephone line 34.

Referring now to the subscriber unit circuit, upon receipt of the half second tone burst pulse train, the tone receiver circuit 900 will produce a series of positive square-wave command pulses having a duration of one-half second and spaced by an interval of one-half second. The output signals from the tone receiver circuit will be fed via command signal line 150 to the input of the subscriber unit total cancel circuit 400.

Total cancel circuit 400 includes an RC network, formed by parallel connected resistor 406 and capacitors 408 and 410, which builds up a staircase voltage waveform upon receipt of the half second command pulse train from the tone receiver 900. After approximately 10 pulses have been received by the total cancel circuit, the voltage level of the staircase waveform will have increased to the firing point of unijunction transistor 412 which when fired, will trigger controlled rectifier 418 into conduction. The controlled rectifier will thereafter conduct operating potential from power bus 134 to the base of transistor 230 in the dialing circuit 200 over line 426. The positive potential will then turn on transistor 230 which grounds the base of transistor 232 renderring it non-conductive to open the current return path for dialing relay R. With dialing relay coil R thus deactivated, dialing contacts K will return to their open position as illustrated, and telephone line 26 will be released. As can be seen from FIG. 2, due to the latching characteristics of controlled rectifier 418, the current path for dialing relay R will remain broken by non-conducting transistor 232 until the rectifier is extinguished by opening main power switch 104 and removing power from the system. Thus, after the operator at the central monitoring complex depresses total cancel switching unit TC, white lamp TCW will go out and red lamp TCR will be turned on and a half second tone burst pulse train will be transmitted to the subscriber location. The subscriber unit will respond to the total cancel pulse train by disabling the dialing relay R to remove the subscriber from the telephone line 26 and prevent subsequent dialing by dialing circuit 200. After the faulty sensor 24 has been replaced, the subscriber unit is placed in its standby state once again by opening power switch 104 (permitting rectifier 418 to be extinguished) and thereafter re-applying power to the system.

In order to further clarify the operation of the overall system of the present invention, a summary of the above described detailed sequence of operation of the preferred embodiment of the present invention will be described.

When an alarm is sensed at the subscriber unit, an arming circuit (rectifier 108) will be latched on and power will be fed to common power bus 124. At that point dialing relay R will be actuated and telephone line 26 will be seized by closure of contacts K. When the line has been connected to the circuit, dial tone sensor 800 will be activated by a second latching circuit (rectifier 120) and simultaneously, an inhibiting voltage will be applied via line 134 to transmit-receive logic circuit 600. Upon actuation, the dial tone sensor will wait for a standard dial tone from the public telephone system, and when received, will fire a third latching circuit (rectifier 136) to energize tape deck 202 upon which is recorded the telephone number of the central control complex. The tape deck will reproduce the control station telephone number and interrupt the line through dialing contacts K to transmit pulses through the public telephone system for initiating the connection of the subscriber unit to an operator station.

After dialing, a 5 second interval will elapse during which the telephone connection through the public telephone system will be made. When the connection has been completed, a ringing signal will be applied to the operator station 32 causing telephone line 34 at the control complex to be seized and an operator notified of the call by white lamp AKW. After a one second delay has elapsed, a recorder 1110 and a visual display unit 1108 will be energized at the operator station to record and display subsequent identification coded signals. At the subscriber unit a nine second coded signal will be generated by the tape deck after the 5 second connect period has terminated, to identify the calling subscriber; the coded signal is recorded at the operator station and is also visually displayed on the console mounted display panel. After the transmission of the subscriber identification code, a 5 second wait interval is programmed into the subscriber unit tape deck to allow the operator at the central monitoring complex to acknowledge receipt of the call by transmitting a 0.2 second tone burst.

If no acknowledge signal is received by the subscriber, the tape will continue and a 2 second tone will be produced by the tape deck to initiate hang-up of the subscriber unit. The 2 second tone signal energizes an accurate two-stage 3 second timing circuit 300 to stop the tape deck while the tape is within a 2 second blank guard band which follows the 2 second hang-up tone. The tape reset timing circuit stops the tape deck unit by extinguishing rectifier 136, but does not effect the remainder of the subscriber unit circuitry. Therefore, since the first latching circuit remains on after the tape deck has been stopped by reset circuit 300, the above-mentioned dialing sequence will be continually repeated until the subscriber unit is reset by extinguishing the first controlled rectifier 136 or until the control station operator acknowledges the call.

When the subscriber unit has dialed the central control complex and the 9 second subscriber identification has been transmitted, the station operator acknowledges the receipt of the subscriber call by transmitting a 0.2 second tone burst signal having a frequency of approximately 2900 cycles per second to the subscriber unit. Upon receipt of the tone burst at the subscriber location, the second and third latching circuits (rectifiers 120 and 136) will be extinguished causing the tape deck and dial tone sensing circuits to be switched off and the transmit-receive inhibit signal removed. When the transmit-receive inhibit signal ceases, the transmit amplifier at the subscriber unit will automatically be energized through a transistor switching network controlled by a logic flip-flop circuit which, when initially energized, comes on in its transmit state. Therefore, upon acknowledgement, the subscriber will be automatically placed in a transmit mode so that audible sounds produced at the subscriber location can be conveyed to the station operator for monitoring.

The station operator can control the direction of communication by alternately actuating transmit-receive switching unit TR between its transmit position and its receive position. When the switch is actuated to either transmit or receive positions, a 0.2 second tone burst will be applied to the telephone line to change the state of the flip-flop circuit in the transmit-receive logic network of the subscriber unit. At the same time operating potential at the control station will be selectively applied to either transmit amplifier 1302 or receive amplifier 1350 in accordance with the desired mode of communication. In other words, when the operator station is switched from receive to transmit, the subscriber unit will be commanded to switch from transmit to receive. Similarly, when the operator at the central monitoring complex switches back to receive, a command signal is sent to the subscriber unit to switch it back to transmit.

When the operator has responded to the alarm and desires to cancel the subscriber unit call, cancel switching unit C is depressed until red lamp CR is let so that a ten second tone burst of the 2900 cycle per second signal will be transmitted from the operator station to the subscriber unit. The subscriber unit receives the ten second tone burst signal which is detected as a positive voltage by tone receiver 900 and utilized to energize a saw tooth generator in the subscriber unit cancel circuit 500. A voltage level is thereafter built up across the saw tooth generator until a firing circuit (Zener diode 518) is tripped to extinguish the first latching circuit (rectifier 108) and remove operating potential from the unit. The subscriber unit is now in its stand-by state and is ready for the receipt of another alarm.

The station operator then places the operator station in its stand-by mode by extinguishing rectifier 1024 of the ringing detector 1000 to release the telephone line from the circuit. The operator station is now ready to answer another call from one of the subscriber units.

In the event that a faulty condition responsive sensor at the subscriber unit maintains switch 100 closed and produces a constant arming signal which causes the subscriber unit to repeat its alarm transmission to the control complex immediately after the termination of the 10 second cancel signal, the station operator can disable the subscriber unit by transmitting a series of half second tone bursts spaced by half second intervals. The tone burst pulse train, when received at the subscriber unit, is fed to the unijunction transistor staircase charging network in total cancel circuit 400. After a number of tone bursts have been received, the voltage level of the charging circuit is sufficient to fire controlled rectifier 418 which disables the subscriber unit dialing relay R causing the subscriber dialing contacts K to open and release the line. The dialing relay coil is thereafter isolated from ground and can only be reengergized after the subscriber unit has been reset by extinguishing the total cancel rectifier 418.

It is noted that the present system utilizes different predetermined envelope variations of a tone signal to perform various control functions. By transmitting tone burst signals having different envelope variations in this manner, any number of different control functions may be be effectively provided by using only a single frequency signal. This of course offers the advantage of a reduction in circuit complexity since complex and precisely tuned selective filtering circuits are not required either at the operator station or at the subscriber unit to discriminate between the different command signals being transmitted. It should be understood, however, that while a single frequency signal is utilized in the preferred embodiment, different frequency signals may be employed in the present invention, each of which being impressed with various envelope variations to provide an even greater total number of command signals.

Thus, the automatic security system of the present invention provides an effective electronic central monitoring system for assuring that rapid and precise remedial action will be taken in response to any number of various diverse alarm conditions detected at any one of a plurality of remote points. Furthermore, since the station operator has complete control over the direction of communication between the central monitoring complex and the subscriber unit and can therefore monitor or speak with a calling subscriber unit at any time during an alarm sequence, unnecessary action in response to either an accidental or an invalid alarm may be minimized.

Inasmuch as the present invention is subject to many variations, modifications and changes in detail, it is intended that all matter contained in the foregoing description or shown in the accompanying drawings shall be interpreted as illustrative and not in a limiting sense.

What is claimed is:

1. An automatic security system for use with a telephone system comprising a subscriber unit connected by a first telephone line to the telephone system and including dialing means connected to said first telephone line for applying dialing pulses corresponding to a preselected telephone number to said first telephone line in response to the occurrence of a predetermined condition, communication circuit means connected to said first telephone line for transmitting and receiving audio communication signals along said first telephone line, and control circuit means connected to said dialing means, said communication circuit means and said first telephone line for selectively controlling said dialing means and said communication circuit means in response to command signals appearing on said first telephone line and having first and second predetermined envelope variations, respectively; and an operator station including circuit means connecting said operator station to a second telephone line of the telephone system upon receipt of a ring signal from the telephone system in response to the dialing of said preselected number by said subscriber unit dialing means, and command signal generating means connected to said second telephone line by said circuit means and having first and second operative modes for selectively applying command signals having said first and second predetermined envelope variations to said second telephone line for transmission to said first telephone line by the telephone system whereby operation of said subscriber unit can be remotely controlled from said operator station.

2. The invention as recited in claim 1 wherein said dialing means includes pulsing means coupled to said first telephone line for electrically generating pulse signals corresponding to said preselected telephone number, and sensing means connected between said first telephone line and said pulsing means for energizing said pulsing means in response to a dial tone signal applied to said first line by the telephone system.

3. The invention as recited in claim 2 wherein said pulsing means includes dialing relay means connected to said first telephone line, and recording means connected to said dialing relay means and said sensing means for selectively operating said dialing relay means in accordance with preselected dialing signals generated by said recording means.

4. The invention as recited in claim 3 wherein said dialing means includes reset means connected to said recording means for de-energizing said pulsing means in response to a reset signal generated by said recording means and having a predetermined duration.

5. The invention as recited in claim 4 wherein said reset means includes a first reset timing means coupled to said recording means, and a second reset timing means connected to said first reset timing means and said pulsing means, each of said first and second reset timing means producing an output signal a predetermined time after an input signal is applied thereto, said predetermined time being less than said predetermined duration of said reset signal and greater than one-half said predetermined duration of said reset signal.

6. The invention as recited in claim 3 wherein said control circuit means includes tone receiver means coupled to said first telephone line for detecting said command signals on said first telephone line and producing output signals in response thereto having first and second time durations corresponding to said first and second predetermined envelope variations, respectively, of said command signals.

7. The invention as recited in claim 6 wherein said tone receiver means includes frequency selective filter means connected with said first telephone line, amplifier means connected with said filter means, envelope detecting means connected with said amplifier means, and waveshaping means connected with said envelope detecting means to produce said first and second time duration output signals in response to said first and second predetermined envelope variations of said command signals, respectively.

8. The invention as recited in claim 6 wherein said control means includes transmit-receive logic circuit means connected to said tone receiver means and said communication means for alternately enabling transmission and reception of audio communication signals by said communication means in response to output signals from said tone receiver means having said first time duration.

9. The invention as recited in claim 8 wherein said communication circuit means includes transducer means, transmit means coupled between said transducer means and said first telephone line for applying sounds picked-up by said transducer means to said first line, and receive means coupled between said transducer means and said first telephone line for audibly reproducing communication signals appearing on said first telephone line.

10. The invention as recited in claim 9 wherein said transmit-receive logic means includes flip-flop means coupled to said tone receiver means and having first and second alternately energized output terminals, and switching means coupled to said output terminals of said flip-flop means and said transmit and receive means of said communication circuit means for alternately energizing said transmit and receive means.

11. The invention as recited in claim 1 wherein said dialing means includes tape deck means storing dialing signals corresponding to said preselected telephone number, identification signals identifying the subscriber unit, and a hang-up signal.

12. The invention as recited in claim 11 wherein said tape deck means includes a tape head for picking up said dialing and identification signals from a magnetic tape, amplifier means connected to said tape head for amplifying said signals, and transformation circuit means connected between said amplifier means and said first telephone line for supplying said dialing and identification signals to said first telephone line.

13. The invention as recited in claim 12 wherein said dialing signals on said magnetic tape are tone burst signals, and said transformation circuit means includes a tone detector and a dialing relay connected to said tone detector and said first telephone line for momentarily opening said first telephone line in accordance with said tone burst dialing signals whereby dialing pulses corresponding to said preselected telephone number are applied to said telephone system.

14. The invention as recited in claim 13 wherein said identification signals on said magnetic tape are tone burst signals, and said dialing relay momentarily opens said first telephone line in accordance with said identification signals whereby a pulse train identifying said subscriber unit is applied through said telephone system to said second telephone line.

15. The invention as recited in claim 14 wherein said hang-up signal on said magnetic tape is a tone signal having a predetermined time duration, and said dialing relay is responsive to said hang-up signal to open said first telephone line for a time interval corresponding to said predetermined time duration whereby said subscriber unit is disconnected from said telephone system.

16. The invention as recited in claim 15 wherein said dialing signal, said identification signals, and said hang-up signals are stored on said magnetic tape in sequence and are separated by blank intervals.

17. The invention as recited in claim 16 wherein said tape is looped upon itself such that said dialing signals, said identification signals and said hang-up signal are continuously repeated when said tape deck means is energized.

18. The invention as recited in claim 17 wherein said dialing means includes dial tone sensing means coupled to said first telephone line for energizing said tape deck in response to a dial tone signal on said first telephone line, and tape reset means responsive to said hang-up signal to de-energize said tape deck.

19. The invention as recited in claim 1 wherein said command signal generating means includes tone signal generating means, switch means connected to said tone signal generating means and said second telephone line, first command circuit means connected to said switch means for opening and closing said switch means to selectively apply said tone signals to said second telephone line in accordance with a first predetermined timing sequence when said command signal generating means is in said first operative mode, and second command circuit means connected to said switch means for opening and closing said switch means to selectively apply said tone signals to said second telephone line in accordance with a second predetermined timing sequence when said command signal generating means is in said second operative mode whereby command signals having said first and second predetermined envelope variations are applied to said second telephone line for transmission to said first telephone line.

20. The invention as recited in claim 19 wherein said first command circuit means includes first timing circuit means connected to said switch means for closing said switch means for a preset time interval.

21. The invention as recited in claim 20 wherein said timing circuit means includes latching means for conducting current to close said switch means when in a conductive state, and charging means coupled to said switch means and said latching means for extinguishing said latching means after said latching means has been in said conductive state for said preset time interval whereby said current flow to said switch means is established for said preset time interval.

22. The invention as recited in claim 21 wherein said second command circuit means includes contact means for selectively establishing a conductive path to said switch means for energizing said switch means, and indicator means coupled to said contact means for generating a visually perceptible signal after a particular time interval has elapsed subsequent to the establishment of said conductive path.

23. The invention as recited in claim 1 wherein said circuit means includes ringing signal detector means connected to said second telephone line, filter means connected to said ringing detector, and switching means connected to said filter means and said second telephone line for closing said second telephone line upon the application of a ringing signal to said second telephone line by the telephone system.

24. The invention as recited in claim 1 wherein said control circuit means includes dial inhibit means for disabling said dialing means in response to a command signal having an envelope variation which is periodic at a predetermined frequency.

25. The invention as recited in claim 24 wherein said dial inhibit means includes staircase generator means connected to said first telephone line for building up a voltage level at an output terminal in response to the receipt at said subscriber unit of a signal having at least said predetermined frequency, and first switch means connected with the output terminal of said staircase generator means and said dialing means for disabling said dialing means upon actuation in response to the voltage level of said staircase generator when said command signal having said periodic envelope variation is applied to said first telephone line.

26. The invention as recited in claim 25 wherein said dialing means includes dialing relay means for selectively opening and closing said first telephone line, and second switch means connected in series with said dialing relay means and further connected to said first switch means of said dial inhibit means for blocking current flow through said dialing relay means in response to the actuation of said first switch means.

27. The invention as recited in claim 26 wherein said command signal generating means includes tone generator means, and means selectively connecting said tone generator means to said second telephone line in accordance with a periodic time sequence signal having said predetermined frequency whereby command signals are applied to said second telephone line for transmission by the telephone system to said first telephone line for disabling said dialing means.

28. The invention as recited in claim 27 wherein said means selectively connecting said tone generator means to said second telephone line includes timing circuit means for generating a pulse train having a frequency which is twice said predetermined frequency, bistable means connected with said timing means for alternately switching between first and second states in response to each pulse of said timing circuit means pulse train, and contact means connected with said bistable means, said tone generator means and said second telephone line for connecting said tone generator means to said second telephone line when said bistable means is in said first state.

29. In an automatic security system including a plurality of subscriber units connected to a telephone system by a like plurality of subscriber telephone lines, an operator station comprising control switch means connected to said operator telephone line and having first and second operative positions, communication circuit means connected to said operator telephone line by said control switch means when said control switch means is in said first operative position for transmitting and receiving audio communication signals along said telephone line, tone generator means connected to said operator telephone line by said control switch means when said control switch means is in said second operative position, control circuit means connected to said control switch means for actuating said control switch means between said first and second operative positions in accordance with one of a plurality of preselected timing sequences whereby a like plurality of envelope modulated command signals are applied to said operator telephone line for transmission by the telephone system to said plurality of subscriber telephone lines, said control circuit means including timing means connected to said control switch means for momentarily actuating said control switch means between said first and second operative positions in accordance with a preselected timing sequence whereby a single pulse envelope modulated command signal is applied to said operator telephone line, and said timing means including controlled rectifier means connected to actuate said control switch means when in a conductive state, storage means connected with said controlled rectifier means for building up an electrical charge thereacross when said controlled rectifier is conductive, and transistor switch means connected between said storage means and said controlled rectifier means for rendering said controlled rectifier non-conductive when said electrical charge has reached a predetermined value.

30. The invention as recited in claim 29 wherein said transistor switch means comprises a unijunction transistor.

31. In an automatic security system including an operator station connected to a telephone system by an operator telephone line, a plurality of subscriber units each comprising dial tone sensing means connected to a subscriber telephone line for generating an output signal in response to the occurrence of first and second predetermined conditions, dialer means connected to said dial tone sensing means and said subscriber telephone line for applying dialing pulses corresponding to a preselected telephone number to said subscriber telephone line in response to said output signal from said dial tone sensing means, communication circuit means connected to said first telephone line and having a first mode for transmitting audio communication signals along said subscriber telephone line and a second mode for receiving audio communication signals appearing on said subscriber telephone line, and control circuit means connected to said dialer means, said communication means and said subscriber telephone line for disabling said dialer means in response to a command signal appearing on said subscriber telephone line and having a first predetermined envelope variation, and for alternately switching said communication circuit means between said first and second modes in response to a command signal appearing on said subscriber telephone line and having a second predetermined envelope variation.

32. The invention as recited in claim 31 wherein said communication circuit means includes transducer means, transmit means connected between said transducer means and said subscriber telephone line for applying audio signals picked up by said transducer means to said subscriber telephone line, receive means connected between said subscriber telephone line and said transducer means for audibly reproducing audio signals appearing on said subscriber telephone line, and bistable means connected to said transmit means, said receive means, and said control circuit means for alternately energizing said transmit and receive means in response to command signals having said second predetermined envelope variations whereby said communication circuit means is alternately switched between said first and second modes.

33. The invention as recited in claim 32 wherein said transmit means comprises a transmit audio amplifier for amplifying sounds picked up by said transducer means.

34. The invention as recited in claim 33 wherein said receive means includes a receive audio amplifier adapted to amplify audio sounds appearing on said telephone line for reproduction by said transducer means.

35. The invention as recited in claim 34 wherein said receive means further includes a tone filter connected between said receive audio amplifier and said subscriber telephone line for blocking passage of said command signals to said receive audio amplifier.

36. The invention as recited in claim 35 wherein said transducer means comprises a speaker-microphone.

* * * * *